(12) United States Patent
Scheimann et al.

(10) Patent No.: US 12,420,312 B2
(45) Date of Patent: Sep. 23, 2025

(54) METHODS AND SYSTEMS FOR DETECTING AND CONTROLLING THE DOSAGE AND RESIDUAL CONCENTRATION OF HARD SURFACE CLEANERS AND RINSE AIDS IN AN AUTOMOTIVE PARTS WASHER

(71) Applicant: ECOLAB USA INC., Saint Paul, MN (US)

(72) Inventors: David W. Scheimann, Saint Paul, MN (US); Paul Balent, Saint Paul, MN (US); Benjamin Riley, Saint Paul, MN (US); Ashly Wagner, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/352,529

(22) Filed: Jul. 14, 2023

(65) Prior Publication Data
US 2024/0017298 A1    Jan. 18, 2024

Related U.S. Application Data

(60) Provisional application No. 63/368,544, filed on Jul. 15, 2022.

(51) Int. Cl.
*B08B 3/02*  (2006.01)
*B08B 3/14*  (2006.01)
*G01N 21/33* (2006.01)

(52) U.S. Cl.
CPC ............... *B08B 3/022* (2013.01); *B08B 3/14* (2013.01); *G01N 21/33* (2013.01); *B08B 2203/0217* (2013.01)

(58) Field of Classification Search
CPC ... B08B 3/022; B08B 3/14; B08B 2203/0217; B08B 13/00; G01N 21/33
See application file for complete search history.

(56) References Cited

U.S. PATENT DOCUMENTS 4,744,379 A    5/1988    Goettel
5,091,082 A    2/1992    Yost
(Continued)

FOREIGN PATENT DOCUMENTS

CA       2369064 A1     2/2000
CN     214865740 U     11/2021
(Continued)

OTHER PUBLICATIONS

International Search Report and Written Opinion in PCT/US2023/070193, mailed Nov. 21, 2023, 20 pages.
(Continued)

*Primary Examiner* — Erin F Bergner
(74) *Attorney, Agent, or Firm* — McKee, Voorhees & Sease, PLC

(57) ABSTRACT

The present disclosure relates to methods and systems for detecting and controlling the dosing and residual concentration of hard surface cleaners and rinse aids in an automotive parts washer. In particular, the methods and systems are particularly suitable for washing systems employed prior to exterior plastic part painting. The methods and systems comprise a UV meter, a controller, and a metering pump; wherein the controller is in electrical communication with the UV meter and the metering pump.

18 Claims, 25 Drawing Sheets

(56) References Cited

U.S. PATENT DOCUMENTS

| | | | |
|---|---|---|---|
| 5,137,694 A | 8/1992 | Copeland et al. | |
| 5,286,300 A | 2/1994 | Hnatin et al. | |
| 6,838,422 B2 | 1/2005 | Man et al. | |
| 11,155,769 B2 | 10/2021 | Ellingson et al. | |
| 11,746,306 B2 | 9/2023 | Ellingson et al. | |
| 2002/0147124 A1 | 10/2002 | Klos et al. | |
| 2004/0200511 A1 | 10/2004 | Klos et al. | |
| 2007/0138401 A1 | 6/2007 | Tokhtuev et al. | |
| 2008/0078430 A1 | 4/2008 | Errington | |
| 2009/0212236 A1* | 8/2009 | Tokhtuev | G01N 21/6402 250/564 |
| 2017/0121200 A1 | 5/2017 | Brozell | |
| 2018/0111173 A1* | 4/2018 | Bertness | B08B 9/0325 |
| 2022/0010237 A1 | 1/2022 | Ellingson et al. | |
| 2022/0056369 A1 | 2/2022 | Kieffer et al. | |

FOREIGN PATENT DOCUMENTS

| | | | |
|---|---|---|---|
| EP | 2939263 A1 | 11/2015 |
| JP | S51120050 A | 10/1976 |
| JP | H0961349 A | 3/1997 |
| SU | 66937 A1 | 11/1945 |
| SU | 142117 A1 | 11/1961 |
| WO | 2014105765 A1 | 7/2014 |
| WO | 2022093556 A1 | 5/2022 |

OTHER PUBLICATIONS

Global Finishing Solutions, "Industrial Pretreatment Washers," globalfinishing.com, Jul. 30, 2019, 2 pages.

\* cited by examiner

| | Additional Plastech LP | Measured % Transmission @ 245nm | | Determined Plastech LP Concentration | | | |
|---|---|---|---|---|---|---|---|
| | | Hach (%Trans @ UV254) | Realtech (%Trans @ UV254) | Estimated LP Conc (Hach Method) | Plastech LP Conc by Formulation (Hach DR-5000) | Real Tech Estimated LP Conc | Plastech LP Conc by Formulation (Realtech) |
| RO water | 0 | 100 | 100 | 0.00 | 0.00 | 0.00 | 0.00 |
| Washer Stage 2 as received | 0.00 | 6.9 | 5.7105 | 1.095 | 0.984 | 0.97 | n/a |
| Washer Stage 2 | 0.10 | 5.2 | 3.9874 | 1.25 | 1.20 | 1.095 | 1.07 |
| Washer Stage 2 | 0.25 | 3.6 | 2.7654 | 1.43 | 1.35 | 1.214 | 1.22 |
| Washer Stage 2 | 0.50 | 1.9 | 1.2486 | 1.65 | 1.60 | 1.487 | 1.47 |
| Washer Stage 2 | 0.75 | 1.2 | 0.6127 | 1.745 | 1.85 | 1.729 | 1.72 |
| Washer Stage 2 | 1.00 | 0.8 | 0.2838 | 1.809 | 2.10 | 1.99 | 1.97 |

*FIG. 4B*

Washer Stage #1 Concentration Determination: Corresponding to FIGS. 5A-5C

| | Determined Plastech LP Concentration | | |
|---|---|---|---|
| | Real Tech Unit | Conductivity (based upon City Water) | Conductivity (based upon RO Water) |
| City Water | 0.00 | 0.00 | N/A |
| Washer Stage 1 | 0.55 | 0.475 | N/A |
| Washer Stage 2 | 0.00 | -0.17 | Need RO Cal curve |
| Washer Stage 3 | 0.00 | -0.16 | Need RO Cal curve |
| Washer Stage 4 | 0.00 | -0.18 | Need RO Cal curve |

Soap Stage

Stage #1: City Water & Plastech LP
Stages #2,3,4: RO water

At PO, we run between 0.5 and 1%. This is on the low side for most washers. Typically would target 2%.

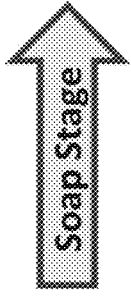

*FIG. 6A*

| Sample | Additional Plastech LP | Measured % Transmission @ 245nm — Conductivity | Measured % Transmission @ 245nm — Realtech (%Trans @ UV254) | Determined Plastech LP Concentration — Conductivity Determined Plastech LP Conc | Determined Plastech LP Concentration — Conductivity Calculated Plastech LP Conc | Determined Plastech LP Concentration — Real Tech Estimated LP Conc | Determined Plastech LP Concentration — Plastech LP Conc by Formulation (Realtech) |
|---|---|---|---|---|---|---|---|
| Washer Stage 1 (as received) | 0.00 | 256 | 17.0 | 0.449 | 0.449 | 0.564 | 0.564 |
| Washer Stage 1 | 0.10 | 299 | 12.4 | 0.556 | 0.549 | 0.672 | 0.664 |
| Washer Stage 1 | 0.25 | 369 | 7.6 | 0.712 | 0.699 | 0.841 | 0.814 |
| Washer Stage 1 | 0.50 | 453 | 3.3137 | 0.958 | 0.949 | 1.105 | 1.064 |
| Washer Stage 1 | 0.75 | 541 | 1.7568 | 1.188 | 1.199 | 1.345 | 1.314 |
| Washer Stage 1 | 1.00 | 636 | 0.8035 | 1.436 | 1.449 | 1.610 | 1.564 |

*FIG. 6B*

| Plastech LP | RealTech reading | | | Summary | | |
|---|---|---|---|---|---|---|
| Concentration | City 1 RO Water | City 1 Water | City 2 Water | | | |
| X | Y | Y | Y | Max | Min | Range |
| 0.000 | 98.97 | 95.96 | 87.48 | 98.97 | 87.48 | 11.49 |
| 0.250 | 47.45 | 46.34 | 42.30 | 47.45 | 42.30 | 5.15 |
| 0.500 | 22.74 | 22.37 | 20.45 | 22.74 | 20.45 | 2.30 |
| 0.550 | 19.63 | 19.34 | 17.68 | 19.63 | 17.68 | 1.95 |
| 0.564 | 18.84 | 18.57 | 16.98 | 18.84 | 16.98 | 1.86 |
| 0.660 | 14.21 | 14.04 | 12.84 | 14.21 | 12.84 | 1.36 |
| 0.672 | 13.71 | 13.56 | 12.40 | 13.71 | 12.40 | 1.31 |
| 0.700 | 12.63 | 12.50 | 11.43 | 12.63 | 11.43 | 1.20 |
| 0.750 | 10.90 | 10.80 | 9.89 | 10.90 | 9.89 | 1.02 |
| 0.841 | 8.34 | 8.29 | 7.59 | 8.34 | 7.59 | 0.75 |
| 0.970 | 5.71 | 5.69 | 5.22 | 5.71 | 5.22 | 0.49 |
| 0.984 | 5.48 | 5.47 | 5.01 | 5.48 | 5.01 | 0.47 |
| 1.000 | 5.23 | 5.22 | 4.78 | 5.23 | 4.78 | 0.45 |
| 1.095 | 3.95 | 3.96 | 3.63 | 3.96 | 3.63 | 0.33 |
| 1.105 | 3.84 | 3.84 | 3.52 | 3.84 | 3.52 | 0.32 |
| 1.214 | 2.79 | 2.80 | 2.57 | 2.80 | 2.57 | 0.23 |
| 1.250 | 2.51 | 2.52 | 2.31 | 2.52 | 2.31 | 0.21 |
| 1.345 | 1.89 | 1.91 | 1.75 | 1.91 | 1.75 | 0.16 |
| 1.430 | 1.48 | 1.49 | 1.37 | 1.49 | 1.37 | 0.12 |
| 1.487 | 1.25 | 1.26 | 1.16 | 1.26 | 1.16 | 0.10 |
| 1.500 | 1.20 | 1.22 | 1.12 | 1.22 | 1.12 | 0.10 |
| 1.500 | 1.20 | 1.22 | 1.12 | 1.22 | 1.12 | 0.10 |
| 1.610 | 0.87 | 0.88 | 0.81 | 0.88 | 0.81 | 0.07 |
| 1.729 | 0.61 | 0.62 | 0.57 | 0.62 | 0.57 | 0.05 |
| 1.745 | 0.58 | 0.60 | 0.55 | 0.60 | 0.55 | 0.05 |
| 1.809 | 0.48 | 0.49 | 0.46 | 0.49 | 0.46 | 0.04 |
| 1.990 | 0.28 | 0.29 | 0.27 | 0.29 | 0.27 | 0.02 |
| 2.500 | 0.06 | 0.07 | 0.06 | 0.07 | 0.06 | 0.01 |
| 3.000 | 0.01 | 0.02 | 0.01 | 0.02 | 0.01 | 0.00 |

*FIG. 7B*

| % by weight Plastech LP in City 1 | Determined Plastech LP Concentration | | |
|---|---|---|---|
| | Real Tech % Transmittance | Real Tech % Absorbance | Conductivity |
| RO water | 0.00 | 0.00 | |
| Washer Stage 1 | 0.04 | 0.38 | 0.01 |
| Washer Stage 2 | 0.450 | 0.370 | 0.80 |
| Washer Stage 3 | 0.050 | 0.050 | 0.11 |
| Washer Stage 4 | 0.010 | 0.000 | -0.01 |
| Washer Stage 5 | 0.000 | 0.000 | -0.02 |
| City Water | 0.00 | 0.000 | 0.000 |

*FIG. 10*

METHODS AND SYSTEMS FOR DETECTING AND CONTROLLING THE DOSAGE AND RESIDUAL CONCENTRATION OF HARD SURFACE CLEANERS AND RINSE AIDS IN AN AUTOMOTIVE PARTS WASHER

CROSS REFERENCE TO RELATED APPLICATIONS

This application claims priority under 35 U.S.C. § 119 to provisional application Ser. No. 63/368,544, filed Jul. 15, 2022, herein incorporated by reference in its entirety.

TECHNICAL FIELD

The present disclosure relates to methods and systems for detecting and controlling the dosing and residual concentration of hard surface cleaners and rinse aids in an automotive parts washer. In particular, the methods and systems are particularly suitable for washing systems employed prior to exterior plastic part painting.

BACKGROUND

After the manufacture of automotive parts, the exterior plastic parts and automotive fascia must be thoroughly washed and rinsed ahead of manufacturer painting. The washing systems typically have multiple stages where the plastics go through at least a wash stage where the wash water contains a detergent followed by a rinsing stage. In some washing systems there are multiple washing and/or rinsing stages. During the process the wash water and rinse water are typically sprayed in their respective stages and collected in drains for reuse. The detergent concentration in the reuse wash water is often affected by this due to (1) residual detergent on products (that goes into the rinse stage); (2) soil that washed off and was captured in the reuse wash water; and (3) loss of wash water via splashing and spraying beyond the drains that carries through on parts. For this reason, the wash water must continually and routinely be tested for the proper detergent concentration associated with one or more washing chambers. The current process for testing the wash water is via titration and then the detergent concentration is manually adjusted. This is time consuming, manually intensive, and can necessitate adjustments to the washing system multiple times per day.

Accordingly, it is an objective of this disclosure to provide alternative methods and systems for testing the detergent concentration in the wash water.

A further object of this disclosure is to provide alternative methods and systems for adjusting the detergent concentration in the wash water.

Still another object of this disclosure is to reduce downtime of the washing systems in order to test and correct detergent concentration in wash water.

Still another object of this disclosure is to improve operation of the washing systems by maintaining a desired residual detergent concentration in wash water.

Other objects, advantages and features of the present disclosure will become apparent from the following specification taken in conjunction with the accompanying figures.

BRIEF SUMMARY OF PREFERRED EMBODIMENTS

A preferred embodiment is a plastic car parts and fascia washing system comprising: a washing stage comprising a conveyor belt, a sprayer, and a drain, a metering pump, a sensor, and a controller; wherein the sprayer is configured to spray water and/or water comprising a detergent; wherein the drain comprises an inlet to a collected wash water vessel; wherein the conveyor is configured to carry plastic car parts and/or fascia; wherein the metering pump is configured to release a detergent into a body of water and/or a collected wash water; wherein the sensor comprises a UV meter; wherein the sensor is configured to take a UV transmission measurement of the collected wash water; wherein the controller is in electrical communication with the sensor and the metering pump; wherein the controller stores a calibration plot of UV transmission to concentration of a surfactant species within a detergent; and wherein the calibration plot comprises a set point.

A preferred embodiment is a kit for modifying a plastic car parts and fascia washing system comprising: a sensor, a metering pump; and a controller comprising a transmitter and receiver for electrically communicating with the sensor and with the metering pump; wherein the sensor comprises a UV meter; wherein the controller stores a calibration plot of UV transmission or absorbance to concentration of a surfactant species within a detergent; and wherein the calibration plot comprises a set point.

A preferred embodiment is a method of cleaning plastic car parts and/or fascia comprising: placing plastic car parts and/or fascia on a conveyor; activating the conveyor through one or more washing stages of a washing system; spraying the plastic car parts and/or fascia with a wash water in one or more washing stages of the washing system; wherein the wash water comprises a detergent; wherein the detergent comprises a surfactant; collecting the wash water from the one or more washing stages after spraying; sensing the UV transmission or absorbance of the surfactant in the collected wash water via a sensor; comparing the UV transmission of the collected wash water and a set point on a calibration plot; dosing water or the detergent to the collected wash water; wherein the amount of water and/or detergent is determined by a difference between the UV transmission or absorbance measured and the set point on the calibration plot; and recirculating the collected wash water, which has been dosed with water or the detergent, into the washing system.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE FIGURES

FIG. 4A is based on the comparisons of the city water employed in FIGS. 3A-D.

FIG. 4B compares the conductivity of the wash water containing the detergent at various wash stages with the actual concentration of detergent in the wash water; FIG. 4B is based on the comparisons of the RO and city water employed in FIGS. 3A-3D.

FIG. 6A analyzes the conductivity of the wash water containing the detergent through various wash stages in comparison with the city water without any detergent;

FIG. 6A is based on the comparisons of the city water employed in FIGS. 5A-5C.

FIG. 6B compares the conductivity of the wash water containing the detergent at various wash stages with the actual concentration of detergent in the wash water; FIG. 6B is based on the comparisons of the city water employed in FIGS. 5A-5C.

FIG. 7B indicates the measurements of percent ultraviolet (UV) transmission at 254 nm based on concentration of washing detergent in the city water comparing the transmission data of three separate sample sets from different geographic locations (including two separate different cities and one reverse osmosis water).

FIG. 10 compares the transmittance, absorbance, and conductivity of the wash water at the different Washer Stages.

Figure 1:
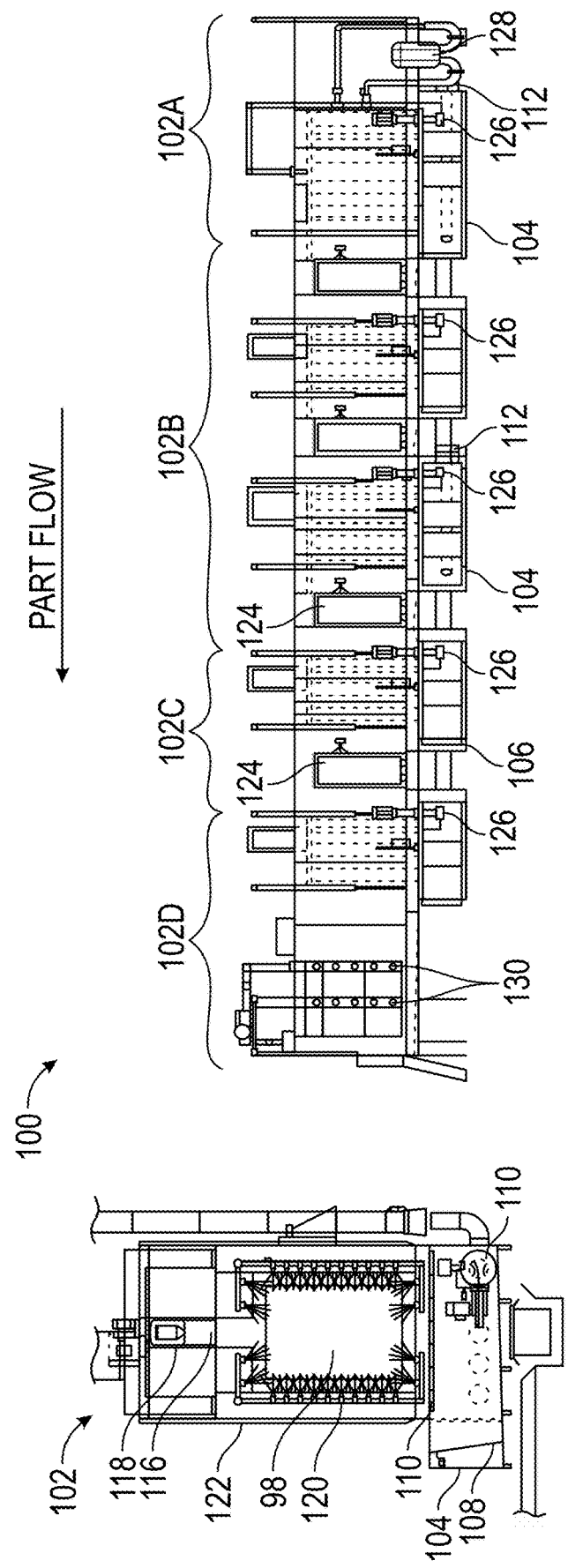
FIG. 1 illustrates an example of a washing system for automotive plastic parts and fascia.

Various embodiments of the preferred embodiments are be described in detail with reference to the figures, wherein like reference numerals represent like parts throughout the several views. Reference to various embodiments does not limit the scope of the inventions disclosed herein. Figures represented herein are not limitations to the various embodiments according to the inventions disclosed and are presented for exemplary illustration of the invention.

DETAILED DESCRIPTION OF THE PREFERRED EMBODIMENTS

In the following detailed description, reference is made to the accompanying figures, which form a part hereof. In the illustrative embodiments described in the detailed description, figures, and claims are not meant to be limiting. Other embodiments may be utilized, and other changes may be made, without departing from the spirit or scope of the subject matter presented here.

The present disclosure relates to methods and systems for testing the wash water of an automotive parts washing system, as well as, methods and systems for adjusting the detergent concentration in the wash water of the automotive parts washing system. The systems and methods have many advantages over conventional and existing systems and methods for testing and adjusting the wash water in automotive parts washing systems. A benefit of this disclosure is to provide a more rapid test of the wash water. Still a further benefit is that the test method can be automated to reduce the need for manual testing. Yet another benefit of the present disclosure is that the test method can be integrated to the adjustment of the detergent concentration so that an automated system could test the wash water and adjust the detergent concentration automatically. Another benefit of this disclosure is that the methods and systems are able to reduce downtime of the washing systems.

The embodiments of this disclosure are not limited to particular automotive parts washing systems (including those with more or less stages) which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of the preferred embodiments are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, concentration, mass, volume, time, temperature, wavelength, pH, etc. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The term "hard surface" refers to a solid, substantially non-flexible surface such as an automotive parts, including those of cars, trucks, ATVs, tractors, boats, and the like. The hard surface parts can include for example doors, fenders, handles, paneling, including exterior paneling, roofs, trim, and the like. Hard surfaces may include for example, health care surfaces and food processing surfaces, production equipment, parts, belts, conveyors, instruments, a counter top, tile, floor, wall, panel, window, plumbing fixture, kitchen and bathroom furniture, appliance, engine, circuit board, and dish.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Systems and Methods for Monitoring and Adjusting Detergent Concentration

The plastics and fascia wash system is a critical step in cleaning and removing contaminants like mold release compounds, oils, dust, dirt and grime from the fascia parts prior to the painting process. If the parts are not cleaned thoroughly, there will be paint adhesion issues and the result will be defects in the painted parts which will require expensive rework or potentially resulting in the parts having to be discarded. Thus, it is imperative that the plastics and other fascia components are thoroughly cleaned prior to painting.

It is very difficult to standardize the process across washing system locations and even within a particular washing plant. This is because the water at each location is often different (thus, variations in mineral content and pH) and the wash process itself creates variations in the wash water based on changes in detergent concentration and variations in contaminants within the water. Because of this, washing systems employ a manual titration program repeatedly throughout a day, or week at best. The titration method has proven to be highly variable and inaccurate for a number of reasons. First, the titration system is itself very dependent upon the local water sources like local city water and potentially reverse osmosis water quality. The titration methods also depend upon uniform detection of a colorimetric change of a chemical indicator by acid/base titration. The detection of the endpoint which is used to derive the concentration thru a calibration table is both very operator and location dependent. While the method is more accurate in the lab environment by a skilled single operator in practicality, i.e., in field use, this is impracticable and poses a significant challenge. Being able to accurately detect, monitor (without need for titration), and control the concentration in the different washer stages provides a critical mechanism for maintaining performance of the program in all washer stages in a plastic parts and fascia cleaning system and method.

In an embodiment, the wash water can be sprayed while the parts are moving through a tunnel (or other site) spraying the formulations. This process can be manual, partially or fully automated. In an exemplary embodiment, the process can take place on a stationary or moving surface, such as a conveyor belt that brings parts through a sprayer. In another embodiment, the use solution of the composition can be dosed into a tank or other holding means and the parts are submerged therein.

The contacting of the surface with a detergent wash water can be part of a multi-part process or a multi-phase system. In an embodiment, a detergent wash water is contacted to a surface in need of cleaning and rinsing before a coating or a paint is applied to the surface. Exemplary steps in the process or system employing the hard surface rinse aid composition may include an initial prewash or hot wash step, a washing step with additional soaps and/or cleaners, one or more rinse steps, and a drying step. The contacting of the surface with the use solution of the composition can be for about 60 seconds to a few hours, from a few minutes to a few hours, or from about 10 minutes to about 60 minutes.

In a preferred embodiment, the detergent wash water cleans and dries a surface within about 30 seconds to a few minutes, or within about 30 to about 90 seconds after the aqueous solution is removed (i.e. the surface is removed from a tank where it is submerged in the composition). Preferably, the detergent wash water provide a dynamic contact angle providing efficient sheeting without leaving debris on the treated surface even with the high use concentrations employed. As disclosed herein, a proper detergent concentration will provide optimal conditions for the detergent to induce sheeting, ensure lack of debris remaining on the treated surface despite the high concentration of the surfactant system employed, and confirms a lack of filming on the surface.

While not limited to the following concentrations, preferably a detergent wash water has a concentration of at least about 0.25% to 1% detergent and/or rinse aid in the water, at least about 2% detergent and/or rinse aid in the water, or at least about 3% detergent and/or rinse aid in the water. Preferably, the detergent is in a concentration of less than about 10 wt. %, 9 wt. %, 8, wt. %, 7 wt. %, 6 wt. % or 5 wt. %.

Referring now to the Figures, FIG. 1 shows a plastics and fascia wash system 100. The system 100 includes a pre-treatment washer 102 used for cleaning metal and plastic substrates 98 prior to liquid or powder coating, as well as before and after machining or forming components. The washer 102 is built from heavy-duty materials for greater durability. For example, the tanks 104 on the pretreatment washer 102 can be double-welded, both on the inside and outside, preventing leaks. The tanks 104 can further include stainless or mild steel, overflow gutters and/or drains 106 on all stages, valves for said drains 106, filter screens 108 with bottom sludge dams, a grip strut 110, gas-fired immersion burner 112, removable access covers (e.g. tank cleanout marine doors), and a sloped bottom for easy cleanout. The pre-treatment washer 102 also includes an overhead conveyor 116 protected by conveyor shroud 118. Conveyor shrouds 118 are particular beneficial when used in spray and drain stages. The modular design of the pretreatment washer 102 allows for easier and quicker installation.

The pretreatment washer 102 can also feature clip-on nozzles 120. Each nozzle 120 can be adjusted so as to aim the nozzle 120 at the desired part or product in the washer 102.

The housing 122 can comprise stainless or mild steel. The housing 122 can also include sloped drain decks, bulkhead access doors 124 in the drain stages 102N, entrance and exit exhaust vestibules, silhouettes between all spray sections 102N, and a bolted construction.

The piping system can comprise quick, overhead disconnects, risers with quick disconnects, drains, overflows and counter-flow piping, rapid fill bypass on all stages, vertical pumps 126, thermometers on heated stages, and pressure gauges on all stages.

The wash system 100 can be further enhanced through use of a particle filtration system 128, oil separation systems, and/or recirculating air blow-off system 130.

The number of stages 102N and design of the pretreatment washer 102 is dependent upon the complexity and finish specifications of the parts. A typical multi-stage washer includes a chemical cleaning stage 102A, followed by water and rinse stages. Complex multi-stage washers may also include additional stages 102B-102D, and can include, but are not limited to including: phosphate stages, additional rinse stages, and reverse osmosis or surfactant final rinse stages.

Figure 2A:
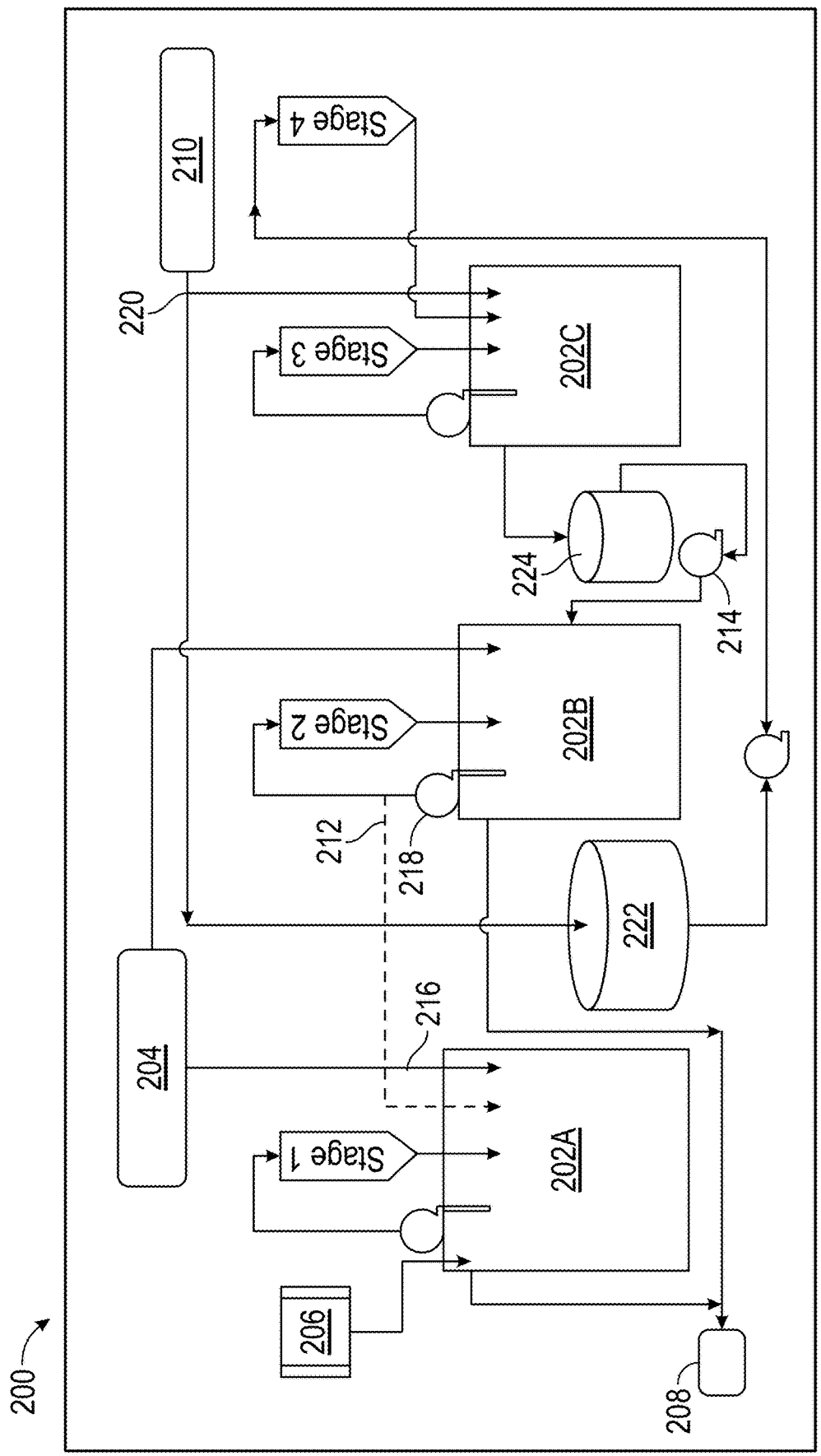
FIG. 2A illustrates an example of a four-stage washing system.

For example, FIG. 2A is a schematic showing an example of a typical four-stage washing system 200 for cleaning plastics. The bath/spray washer system 200 is both an energy-intensive and water-intensive process that utilizes 4 or 5 stages to move clean water (city water 204 or RO water 210) at elevated temperatures as the medium. More particularly, the clean water 204/210 is moved amongst at least three distinct areas 202A, 202B, 202C after being subjected to 1 or more stages in the process. The plastics parts in FIG. 2A moves from the Stage 1 area 202A to the Stage 2 area 202B to the Stage 3 area 202C.

The areas 202A, 202B, and 202C can decrease in fluidic capacity as the stages progress. In one example embodiment, the Stage 1 area 202A has a fluidic capacity of approximately 3480 gallons and facilitates a mixture of city water 204 and soap 206; Stage 2 has a fluidic capacity of approximately 2085 gallons and receives city water 204; and Stage 3 has a fluidic capacity of approximately 1775 gallons and receives RO water 210.

Stage 1 is a chemical cleaning stage. As shown, the chemical cleaning stage receives water directly from the city water supply 204, which is fluidly positioned upstream of the chemical cleaning stage. A soap supply 206 is also fluidly positioned upstream of the Stage 1 area 202A. As shown, the city water supply 204 and soap supply 206 are fluid parallel to one another. Nozzles, pumps, mixing devices, and the like can be employed at Stage 1 to best facilitate the mixture of soap 206 and water 204. After the mixture of soap 206 and water 204 is applied to the plastics, the used mixture is allowed to exit the Stage 1 area 202A via the drain 208. A shut off valve 216 can be included near the fluidic input of the Stage 1 area 202A to facilitate repair of any conduits that are downstream of the city water supply 204.

It is optionally proceeded by Stages 2 and 3 that occur at areas 202B and 202C. Stages 2 and 3 are water and rinse stages. Like Stage 1, Stage 2 can receive a fluidic input directly from the city water supply 204, which is positioned upstream of the Stage 2 area 202B. The use of a pump 218 to facilitate the movement of water throughout the Stage 2 area 202B is particularly beneficial. Optionally, the pump 218 can also be configured to move water from the Stage 2 area through a bypass conduit 212 to the Stage 1 area 202A so that it can be used and/or reused in the Stage 1 area 202A. The Stage 2 area 202B can further include fluidic inputs from other Stages (e.g. Stages 3 and 4) which are located upstream thereof.

Stage 3, like Stage 2 is a water and rinse stage however receives clean water from an RO water supply 210 instead. The clean water can be directly received from the RO water supply 210 or received indirectly from the RO water supply 210 after passing through an RO storage unit 222 having a fluidic capacity of approximately 1150 gallons. Optionally, a pump can help move clean water from the RO storage unit 222 to the Stage 3 area 202C. After water is passed through Stage 3, the water may pass through an overflow tank 224 having a fluidic capacity of approximately 55 gallons before being removed by pump 214 to Stage 2.

Even further, the clean water can be indirectly supplied after being passed through a Stage 4—"reverse osmosis" stage to mimic a water source that undergoes an advanced water filtration system.

Figure 2B:
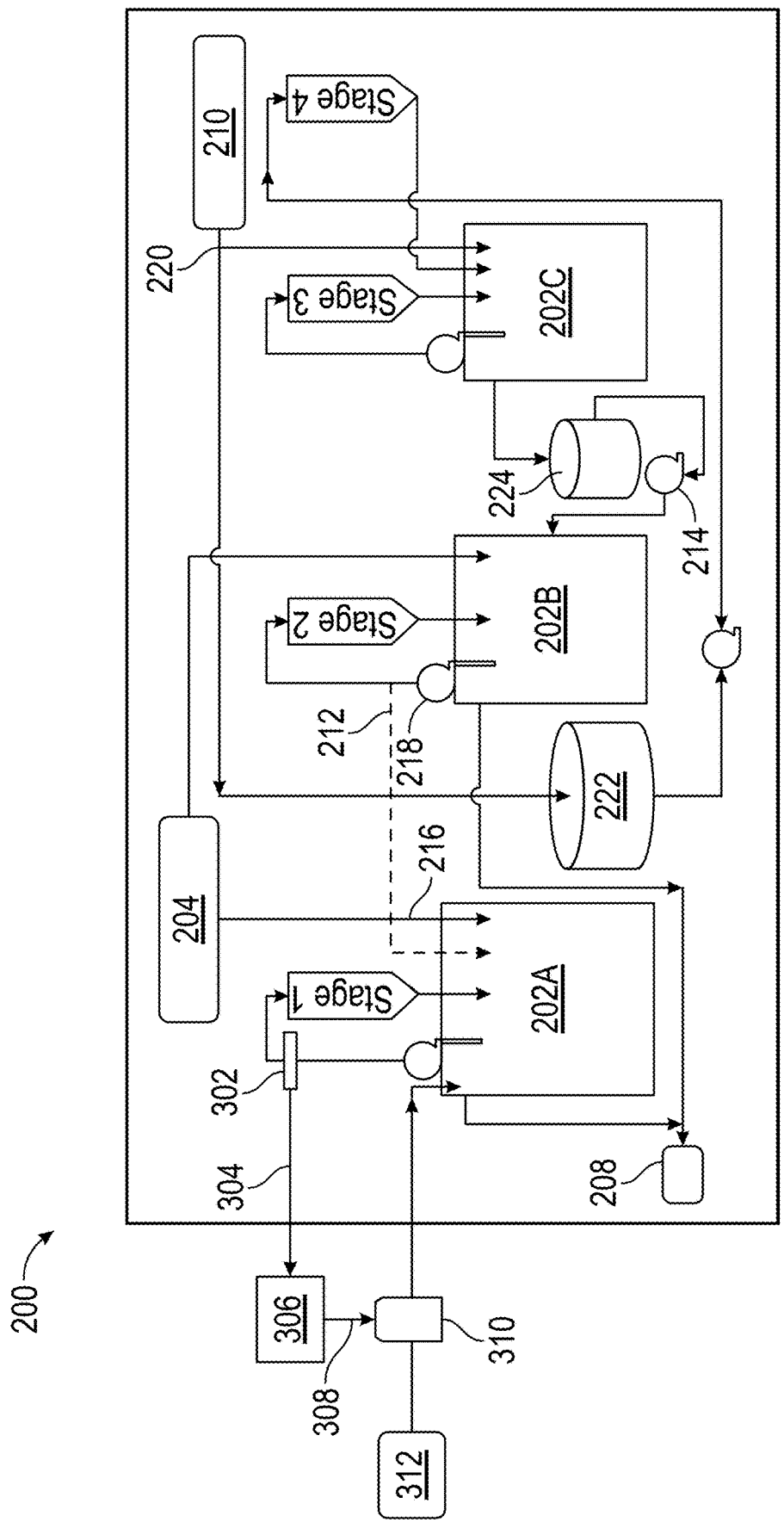
FIG. 2B beneficially modifies the washing system of FIG. 2A, according to at least some aspects of the present disclosure.

FIG. 2B beneficially modifies the washing system of FIG. 2A, according to at least some aspects of the present disclosure, in that system 200 comprises and/or consists essentially of a sensor 302, a controller 306, a metering pump 310, and a detergent source 312. The controller 306 is in communication with the sensor 302 by way of a sensor signal 304 and is also in communication with the metering pump 310 by way of a control signal 308. Preferably, the communication is electrical communication, including but not limited to, a wired electrical commination and/or wireless electrical communication (including, but not limited to, wi-fi communication, Bluetooth communication, radio communication).

Sensor

The sensor 302 is preferably a ultraviolet (UV) meter. Suitable UV meters can be selected based on the wavelength corresponding to the excitation of a surfactant contained in the detergent employed in the washing process. While not limited to this spectrum, as surfactant species can vary, it is believed that the range of 100 nms to 280 nms, covers excitation of many surfactant species often included in automotive detergents. In a preferred embodiment, the sensor is a UV meter that measures transmittance between 100 nms and 280 nms, more preferably between 150 nms and 280 nms, still more preferably between 200 nms and 280 nms, most preferably between 240 nms and 280 nms. For purpose of this disclosure, a 254 UV meter was employed consistently; this was because it corresponded to the excitation of a surfactant used in the test detergent and to assess and validate the systems and methods without need to vary the detergent species or equipment utilized in different locations and other test conditions. The systems and methods disclosed herein need not be limited to a 254 nm UV meter.

In an embodiment, additional sensors can be employed, including, but not limited to, a pH meter and/or a device that measures conductivity.

The sensor 302 can be provided at a location where wash water is collected following a cleaning application. At this location, the sensor 302 can be used to test for a parameter which can correspond to a concentration of detergent in the wash water. Accordingly, additional water 204/210 and/or detergent 312 can be added to the wash water to achieve a set detergent concentration.

The sensor 302 inform a UL-listed, PLC-based control panel, in operative communication with electronic solution-level controls on all stages. Manual solution level controls can be included alongside said electronic solution-level controls on all stages to account for potential electrical failures.

Controller

The controller 306 includes a human-machine interface (HMI) and components for establishing communications. Examples of such a controller 306 may be processing units alone, a programmable logic controller (PLC), an industrial computer that has been ruggedized and adapted for the control of manufacturing processes, a robotic device, or even simply other subcomponents of computing devices. The controller 306 can also include other components and can be implemented partially or entirely on a semiconductor (e.g., a field-programmable gate array ("FPGA")) chip, such as a chip developed through a register transfer level ("RTL") design process.

Metering Pump

The metering pump 310 moves a precise volume of liquid in a specified time period providing an accurate volumetric flow rate. Delivery of fluids in precise adjustable flow rates is sometimes called metering. The metering pump 310 is specific to the application or does not require an exact type of pump to be used, although a couple types of pumps are far more suitable than most other types of pumps. The metering pump 310 can pump water, chemicals, solutions, and other liquids. The metering pumps 310 is preferably rated to be able to pump into a high discharge pressure. The metering pump 310 is made to meter at flow rates which are practically constant (when averaged over time) within a wide range of discharge (outlet) pressure.

Methods of Use

The systems and methods can be applied to a detergent 312 and/or rinse aid for cleaning automotive parts. Automotive parts can be made from a variety of materials including, for example, plastics and plastics containing metal parts, wherein the metals may include aluminum requiring aluminum compatibility. As aluminum is a soft metal the compositions require aluminum compatibility. As referred to herein, aluminum compatibility ensures that any degree of etching that occurs on the surface does not cause corrosion and/or significant weight loss (as a result of etching of the aluminum). Although certain applications of use benefit from acidic compositions which can cause etching on the surface that enables the adherence of a coating, such as paint, corrosion of the surface is not desired.

The detergents 312 for which these methods and systems can be applied vary and can be used in a variety of applications where a clean, spot-free, film-free, dry surface is required.

The temperature of the wash water can vary as well. The water temperature is preferably low temperature, tap temperature, or room temperature. As referred to herein, low temperature includes those at or below about 145° F. (63° C.). In an embodiment, the temperature of the rinse water is up to about 145° F. (63° C.), preferably in the range of 125° F. (51° C.) to 145° F. (63° C.). As referred to herein, "low temperature" refers to those rinse water temperatures below about 145° F. (63° C.).

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Example Embodiments

The inventions are defined in the claims. However, below is a non-exhaustive list of non-limiting embodiments in numbered format. Any one or more of the features of these embodiments may be combined with any one or more features of another example, embodiment, or aspect described herein. Accordingly, the following numbered embodiments also form part of the present disclosure:

Embodiment 1. A plastic car parts and fascia washing system comprising:
 a washing stage comprising a conveyor belt, a sprayer, and a drain; wherein the sprayer is configured to spray water and/or water comprising a detergent; wherein the drain comprises an inlet to a collected wash water vessel; wherein the conveyor is configured to carry plastic car parts and/or fascia;
 a metering pump; wherein the metering pump is configured to release a detergent into a body of water and/or a collected wash water;
 a sensor; wherein the sensor comprises a UV meter; wherein the sensor is configured to take a UV transmission measurement of the collected wash water;
 a controller; wherein the controller is in electrical communication with the sensor and the metering pump; wherein the controller stores a calibration plot of UV transmission to concentration of a surfactant species within a detergent; wherein the calibration plot comprises a set point.

The system of embodiment 1, wherein the UV meter measures transmissions or absorbance at a wavelength of 240 nms to 270 nms.

The system of embodiment 1 or 2, wherein the electrical communication is wireless communication.

The system of any one of embodiments 1-3, further comprising a pH meter or a device that measures conductivity.

The system of any one of embodiments 1-4, wherein the system further comprises a rinsing stage; wherein the rinsing stage comprises a sprayer configured to spray water and a second drain.

The system of any one of embodiments 1-5, wherein the vessel comprises a drum, a vat, and/or a tube.

The system of any one of embodiments 1-6 further comprising a shroud that protects the conveyor.

The system of any one of embodiments 1-7 further comprising a recirculating air blow-off system.

The system of any one of embodiments 1-8 further comprising a particle filter.

Embodiment 10. A kit for modifying a plastic car parts and fascia washing system comprising:
 a sensor; wherein the sensor comprises a UV meter;
 a metering pump;
 a controller comprising a transmitter and receiver for electrically communicating with the sensor and with the metering pump; wherein the controller stores a calibration plot of UV transmission or absorbance to concentration of a surfactant species within a detergent; wherein the calibration plot comprises a set point.

The kit of embodiment 10, wherein the UV meter measures transmissions at a wavelength of 240 nms to 270 nms.

The kit of embodiment 10 or embodiment 11, wherein the transmitter and receiver communicates wirelessly.

The kit of any one of embodiments 10-12, wherein the kit further comprises a water pump; wherein the water pump has an output that can be read by the controller.

Embodiment 14. A method of cleaning plastic car parts and/or fascia comprising:
 placing plastic car parts and/or fascia on a conveyor;
 activating the conveyor through one or more washing stages of a washing system; spraying the plastic car parts and/or fascia with a wash water in one or more washing stages of the washing system; wherein the wash water comprises a detergent; wherein the detergent comprises a surfactant;
 collecting the wash water from the one or more washing stages after spraying;
 sensing the UV transmission or absorbance of the surfactant in the collected wash water via a sensor;
 comparing the UV transmission of the collected wash water and a set point on a calibration plot;
 dosing water or the detergent to the collected wash water; wherein the amount of water and/or detergent is determined by a difference between the UV transmission or absorbance measured and the set point on the calibration plot;
 recirculating the collected wash water, which has been dosed with water or the detergent, into the washing system.

The method of embodiment 14, wherein there is one washing stage.

The method of embodiment 15, wherein the wash water is collected via a drain in the one washing stage.

The method of embodiment 14, wherein there are at least two washing stages.

The method of embodiment 17, wherein the wash water is collected via a drain in each of the two washing stages and combined in a collected wash water vessel.

The method of embodiment 17, wherein the wash water is collected via a single drain located at a downslope from the at least two washing stages.

The method of embodiment 14, wherein the comparing is performed by a controller in communication with the sensor.

The method of embodiment 20, wherein the controller is in wireless communication with the sensor.

The method of embodiment 20, wherein the controller is in communication with a metering pump.

The method of embodiment 22, wherein the metering pump doses the detergent into the collected wash water.

The method of embodiment 20, wherein the controller is in communication with a water pump.

The method of embodiment 24, wherein the water pump doses water into the collected wash water.

The method of any one of embodiments 14-25, wherein the drain comprises a filter.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments, in addition to those shown and described herein, will be apparent to those skilled in the art from the foregoing description. Such modifications are also intended to fall within the scope of the appended claims.

The methods and systems disclosed herein were evaluated and tested with two separate water sources in order to mimic different applications that would be encountered in actual practice. Additionally, one of the water sources was subjected to reverse osmosis treatment to mimic a water source that undergoes an advanced water filtration system. To support these examples a RealTech UV 254 UVT meter was used as well as a Hach DR-6000.

Example 1

Figure 3A:
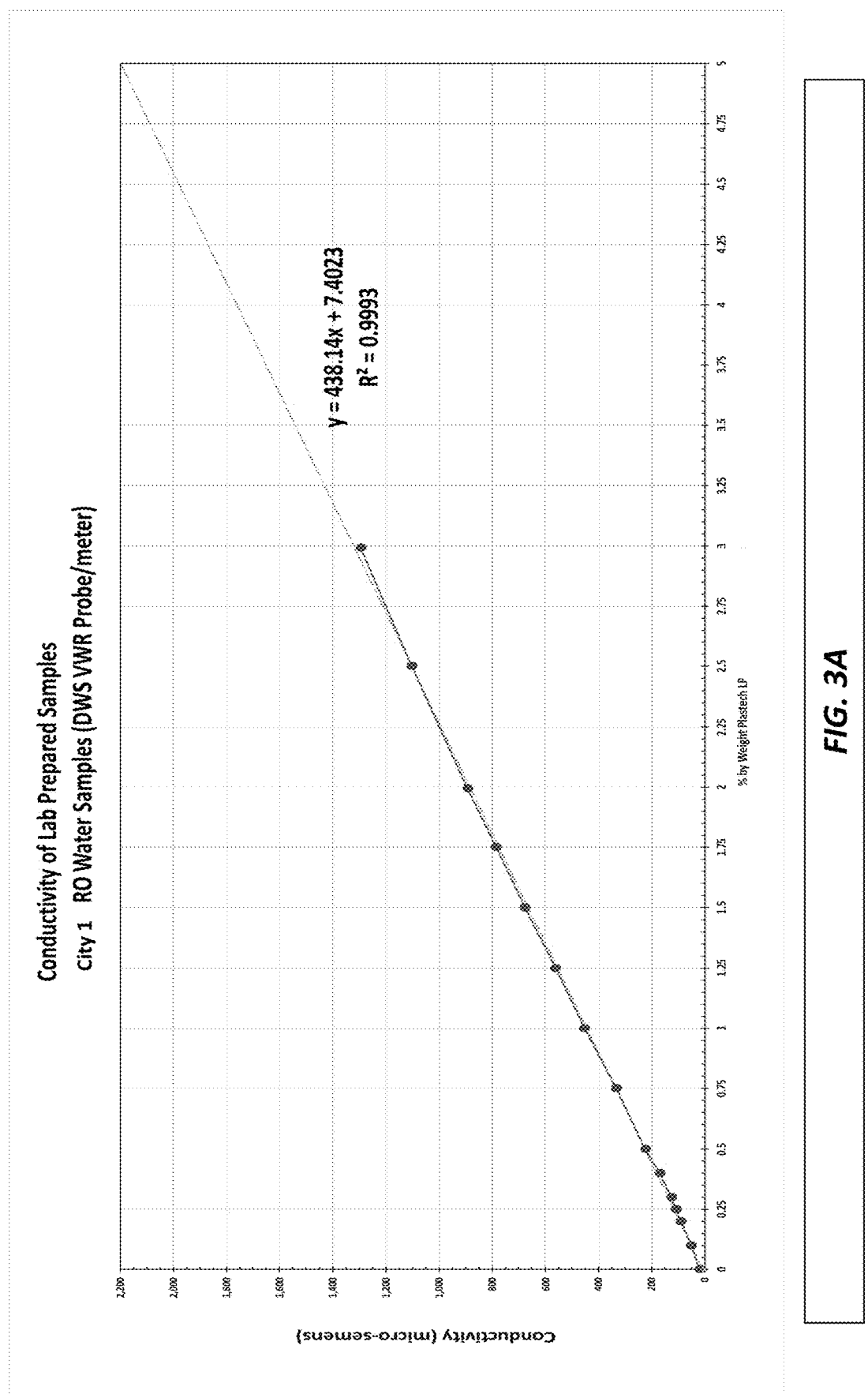
FIG. 3A graphs conductivity based on concentration (by wt. %) of washing detergent in RO water.
Figure 3B:
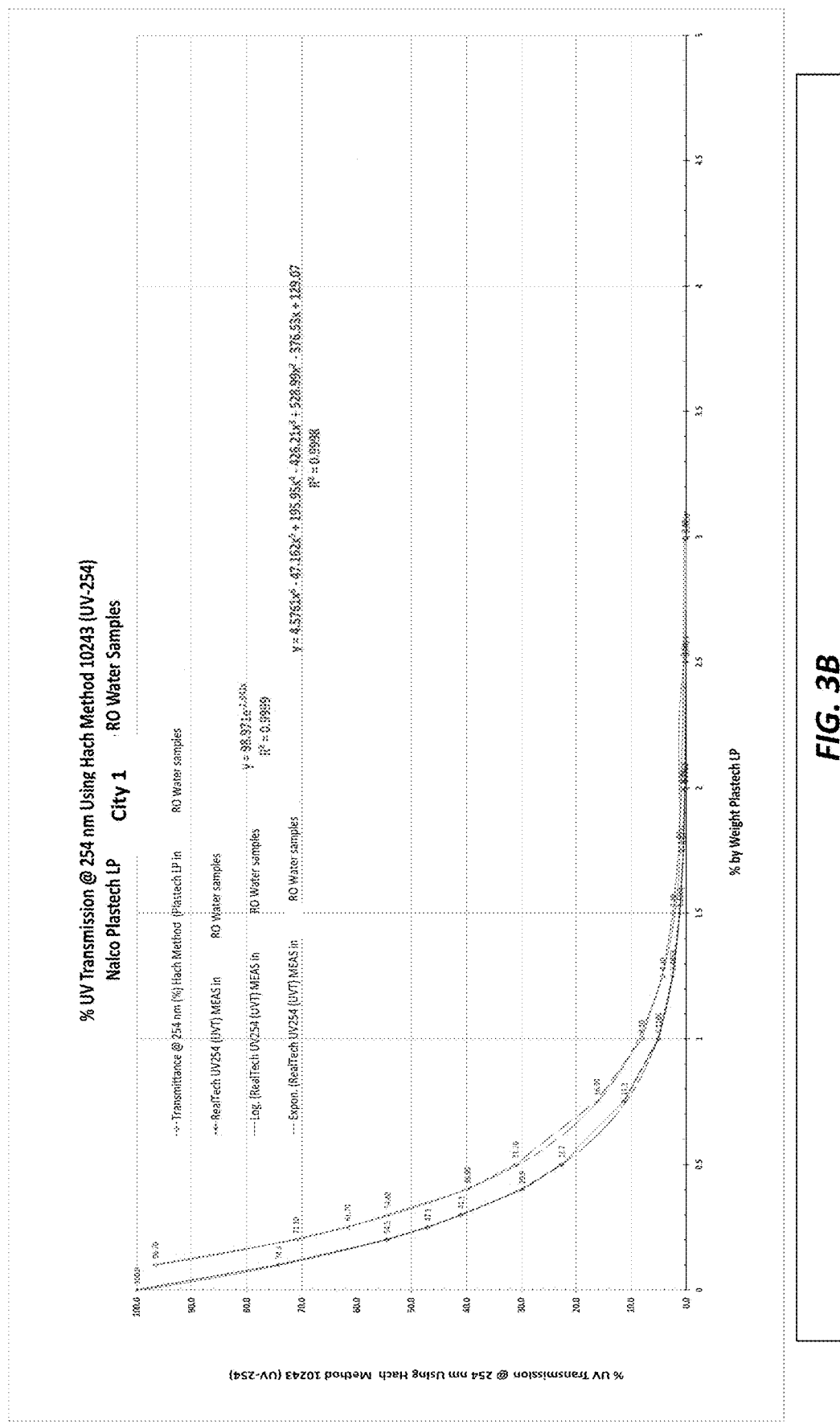
FIG. 3B graphs percent ultraviolet (UV) transmission at 254 nm based on concentration of washing detergent in the RO water corresponding to FIG. 3A.

Water samples were obtained from a city water source. Water direct from the city source was used to prepare a detergent wash water with varying concentrations of detergent. Additionally, the city water was subjected to reverse osmosis filtering and a detergent wash water was prepared with RO water to compare any differences between the ability to monitor city water (with hardness ions) and filtered water. Conductivity measurements were taken with increasing detergent concentrations with a microS instrument. The conductivity measurements were plotted against the concentration of the detergent on a weight percent basis and the results are provided in FIG. 3A. Following that, UV transmission was measured and plotted against the concentration of the detergent on a weight percent basis; the results are provided in FIG. 3B. The transmittance data was collected with both the Hach DR-6000 and the RealTech UV 254 UVT.

Figure 3C:
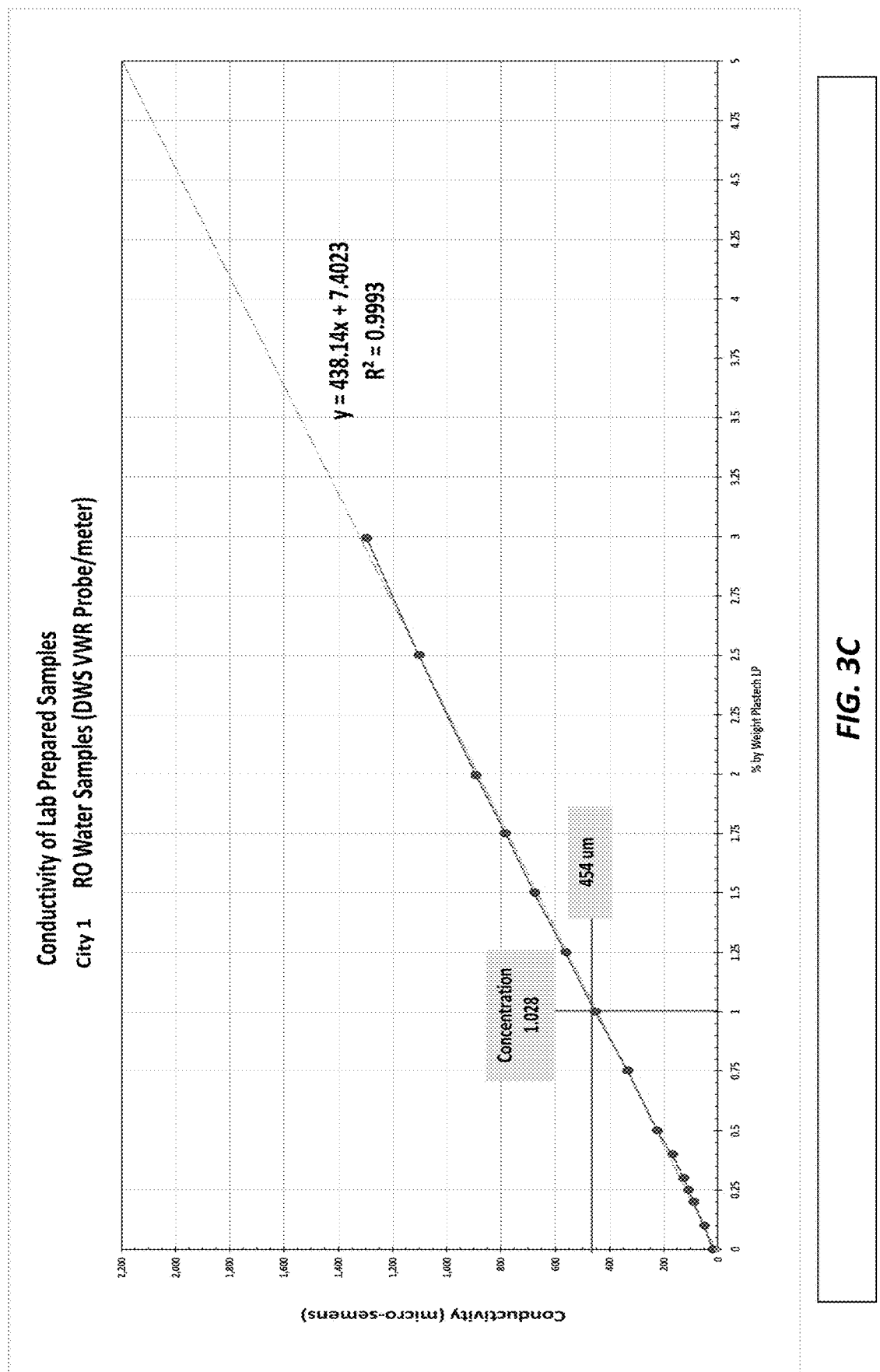
FIG. 3C plots calibration of the conductivity of wash water based on the concentration (by wt. %) of washing detergent in RO water.
Figure 3D:
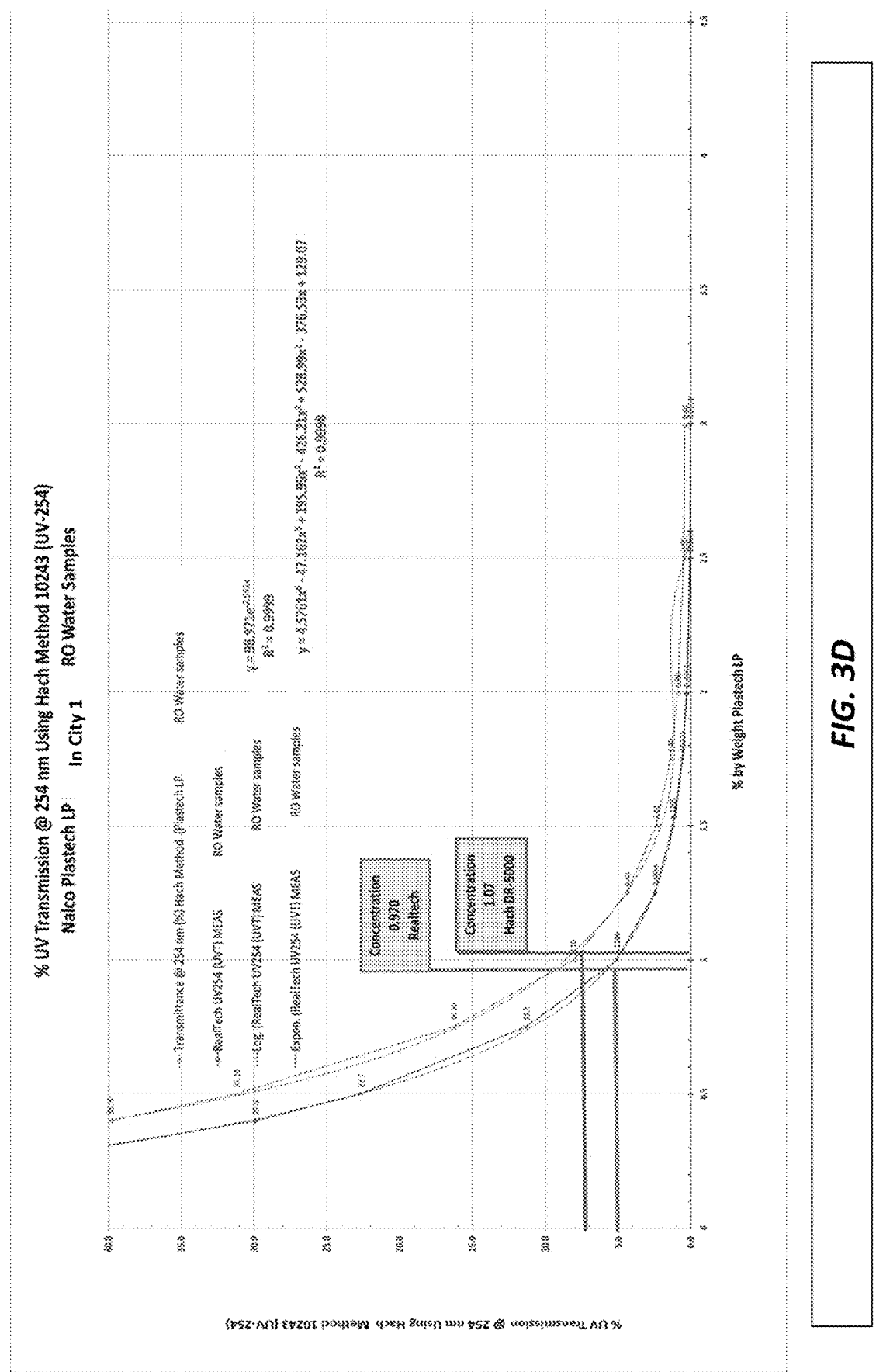
FIG. 3D plots calibration of the percent ultraviolet (UV) transmission at 254 nm based on concentration of washing detergent in the RO water corresponding to FIGS. 3A-3C.
Figure 4A:
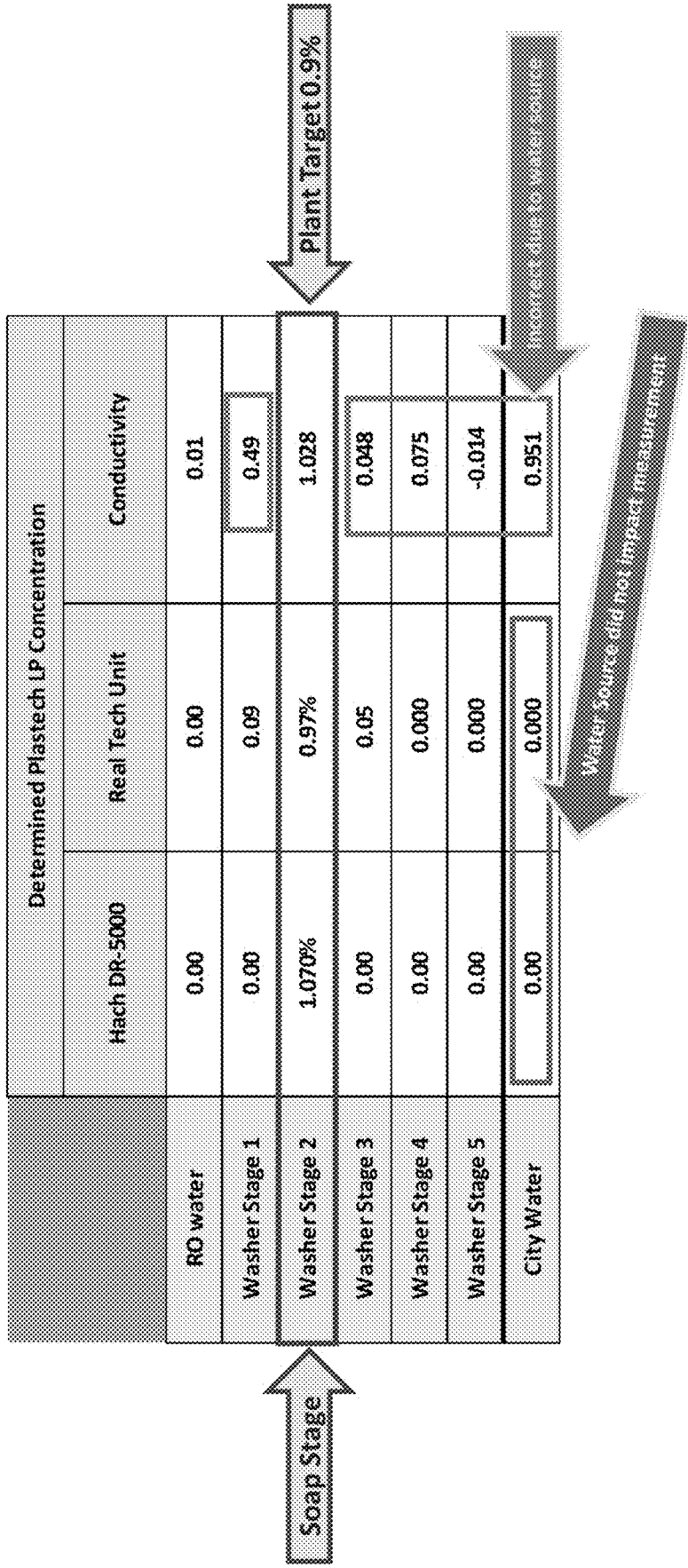
FIG. 4A analyzes the conductivity of the wash water containing the detergent through various wash stages in comparison with the RO and city water without any detergent.

A calibration plot (FIG. 3C) was prepared identifying a standard target concentration for detergent in cleaning plastic automotive parts and fascia. The plot was tested to evaluate changes to the concentration of detergent that may arise from splashing, residual detergent on the automotive parts and increases in soil within the wash water and the ability to monitor those changes based on UV transmittance. The testing was plot is provided in FIG. 3D. The data supporting the plot is provided in table format in FIGS. 4A and 4B. As can be seen from FIGS. 3D, 4A and 4B, changes to the detergent concentration in a wash water can be monitored via UV transmittance data. This can be monitored without need for titration and can be subjected to automated monitoring. Further, the data demonstrated that adjustments to correct the concentration of detergent can be applied based on the calibration plot which identified a set point to adjust the concentration back to. Additionally, the data demonstrates the ability to apply the systems and methods to city water and highly filtered (RO) water.

Example 2

Figure 5A:
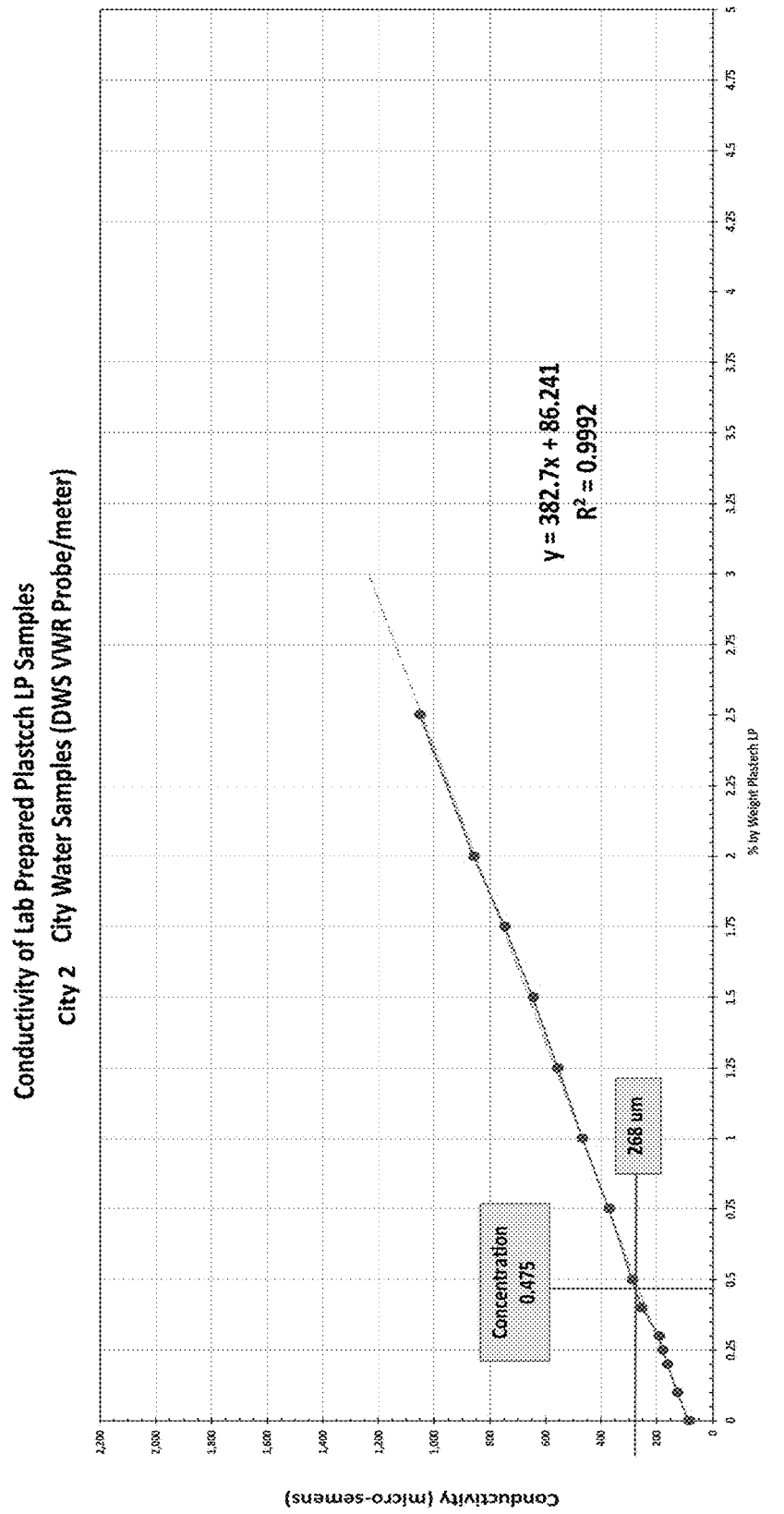
FIG. 5A plots calibration of the conductivity of wash water based on the concentration (by wt. %) of washing detergent in city water.
Figure 5B:
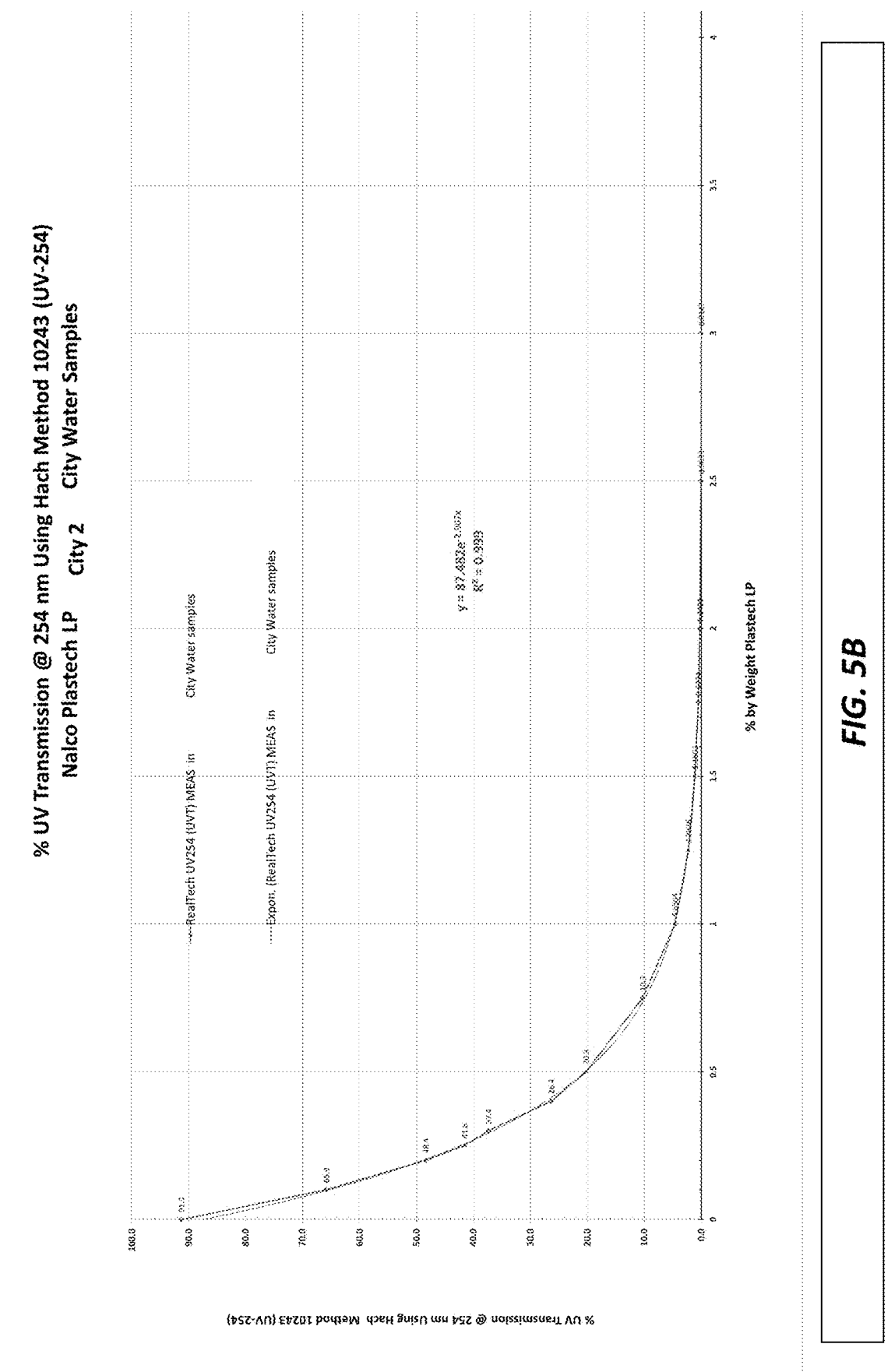
FIG. 5B graphs percent ultraviolet (UV) transmission at 254 nm based on concentration of washing detergent in the city water corresponding to FIG. 5A.

Water samples were obtained from a different city water source than that of Example 1. Conductivity measurements were taken with increasing detergent concentrations with a microS instrument. The conductivity measurements were plotted against the concentration of the detergent on a weight percent basis and the results are provided in FIG. 5A. Following that, UV transmission was measured and plotted against the concentration of the detergent on a weight percent basis; the results are provided in FIG. 5B. In this instance, only the RealTech UV 254 UVT was used to collect transmittance data.

Figure 5C:
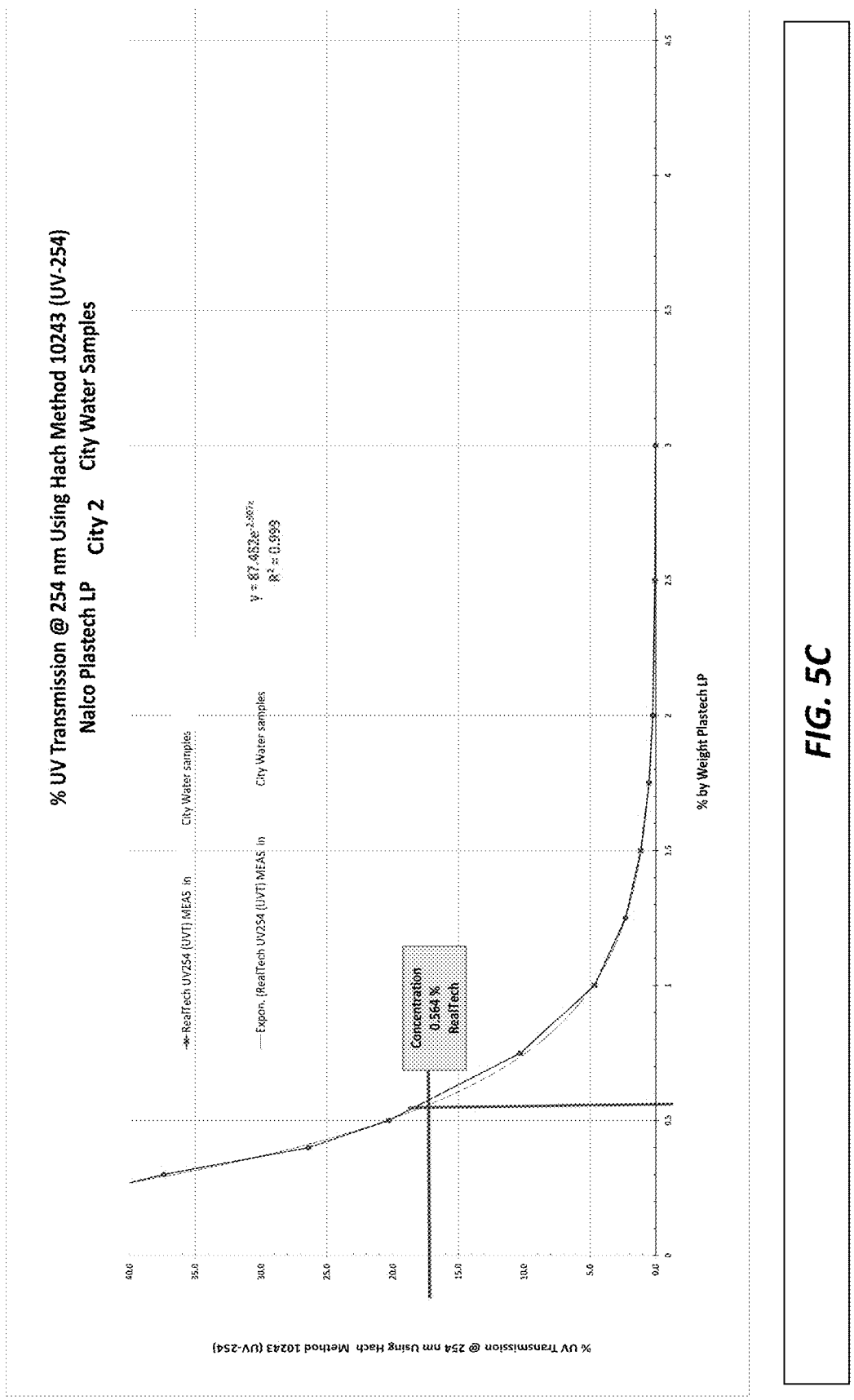
FIG. 5C plots calibration of the percent ultraviolet (UV) transmission at 254 nm based on concentration of washing detergent in the city water corresponding to FIGS. 5A-5B.

The ability to monitor and adjust concentration of detergent was evaluated along with the ability to monitor those adjust the concentration based on UV transmittance readings. This testing was plotted and is provided in FIG. 5C. The data supporting the plot is provided in table format in FIGS. 6A and 6B. As can be seen from FIGS. 5C, 6A and 6B, changes to the detergent concentration in a wash water can be monitored via UV transmittance data. This data, based on a different water source demonstrates, that it can be monitored without need for titration and can be subjected to automated monitoring. Further, the data again demonstrated that adjustments to correct the concentration of detergent can be applied based on the calibration plot which identified a set point to adjust the concentration back to.

Example 3

Figure 7A:
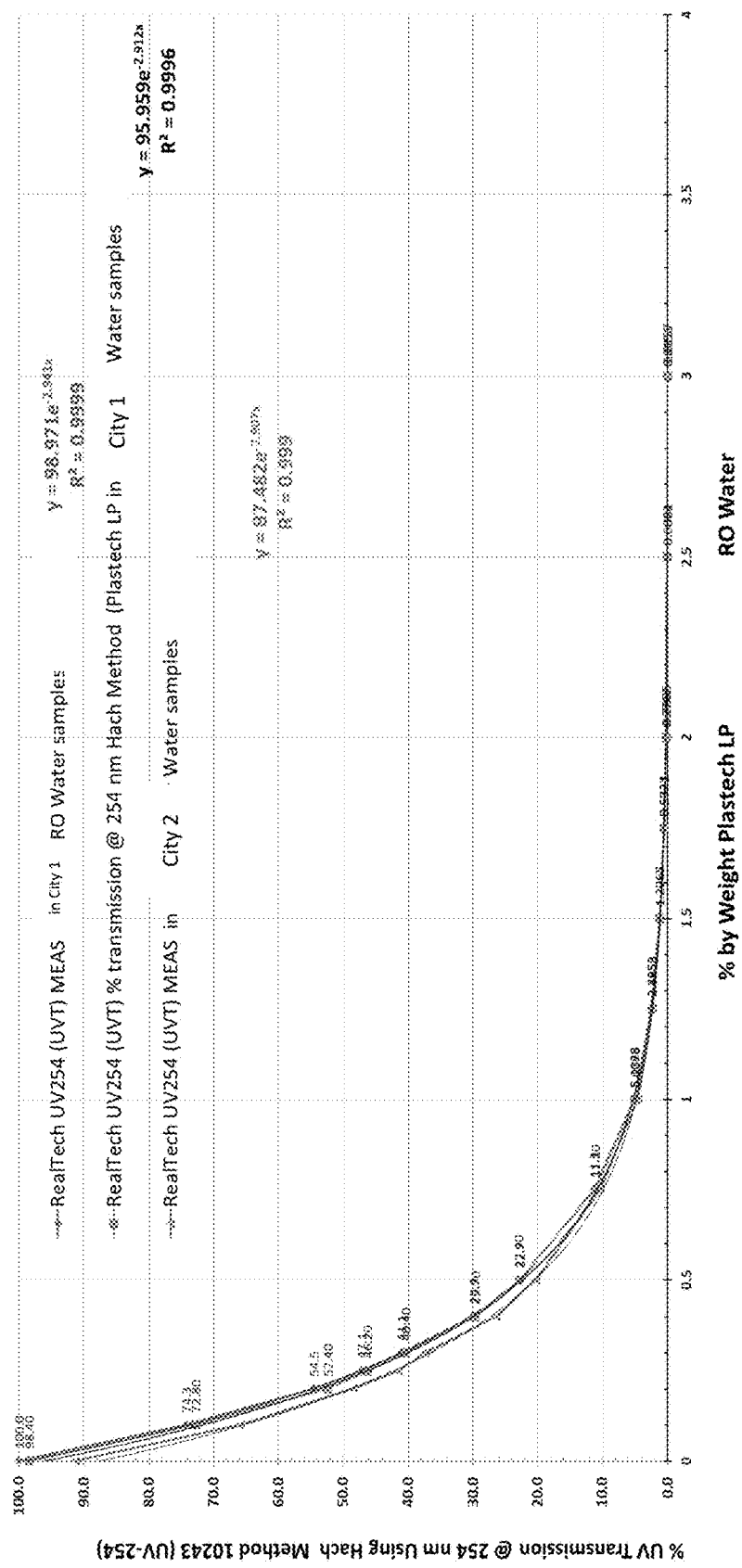
FIG. 7A graphs percent ultraviolet (UV) transmission at 254 nm based on concentration of washing detergent in the city water comparing the transmission data of three separate sample sets from different geographic locations (including two separate different cities and one reverse osmosis water).

For comparative purposes, the data collected in Example 2 and in Example 3 was compared in a log plot (FIG. 7A) contrasting UV transmittance data based on the concentration of detergent in the city water from Example 1, the reverse osmosis water from Example 1, and the city water from Example 2. The data compared was only the RealTech data as not all of the samples were subjected to the Hach instrument. The data in the chart is provided in Table format in FIG. 7B.

Again, the data, based on different water sources with differing levels of filtration, demonstrates monitoring and adjustments can be performed without the need for titration. Further, the data again demonstrated that adjustments to correct the concentration of detergent can be applied based on the calibration plot which identified a set point to adjust the concentration back to.

Example 4

Figure 8A:
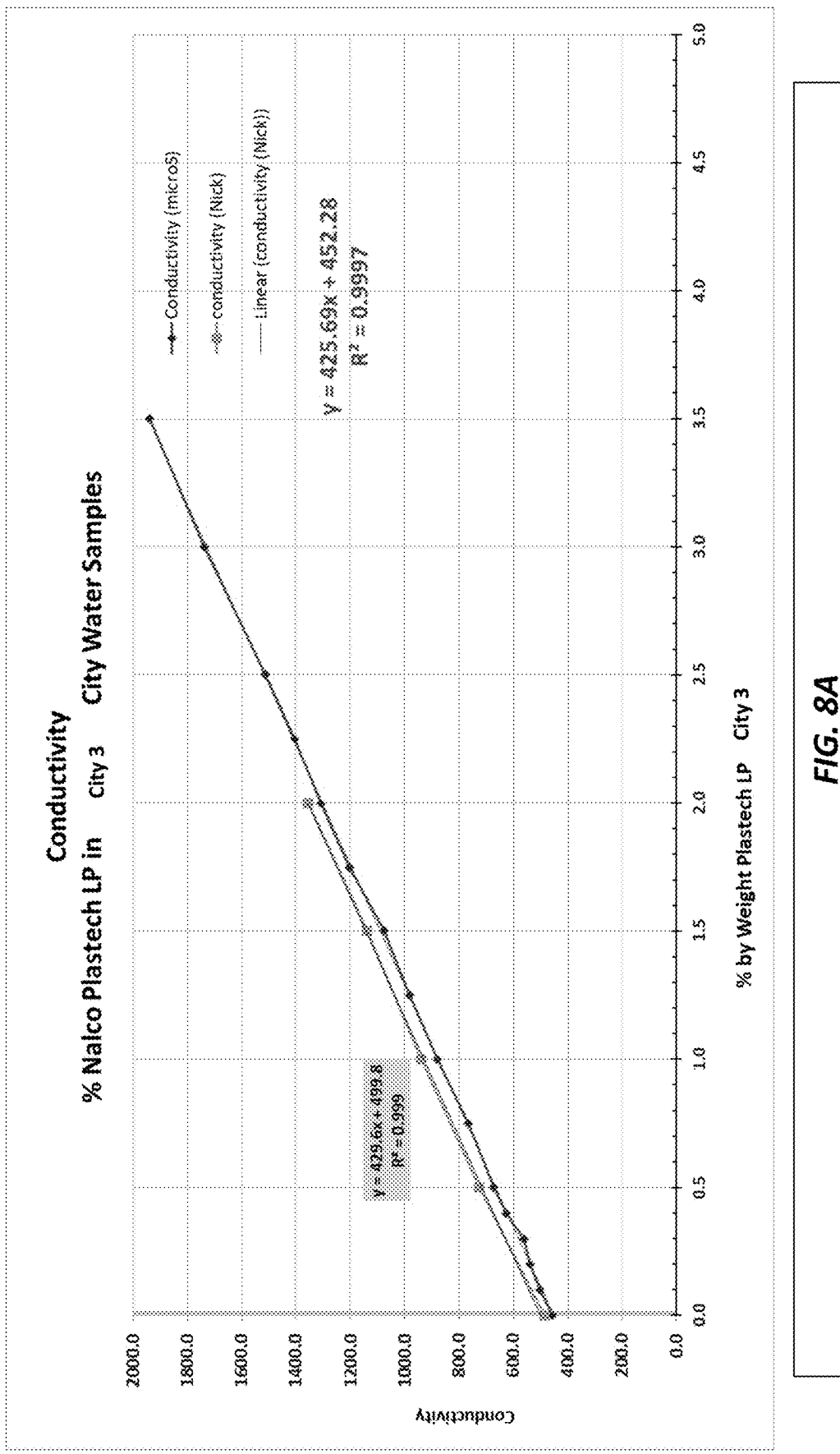
FIG. 8A graphs conductivity based on concentration (by wt. %) of washing detergent in a city water.
Figure 8B:
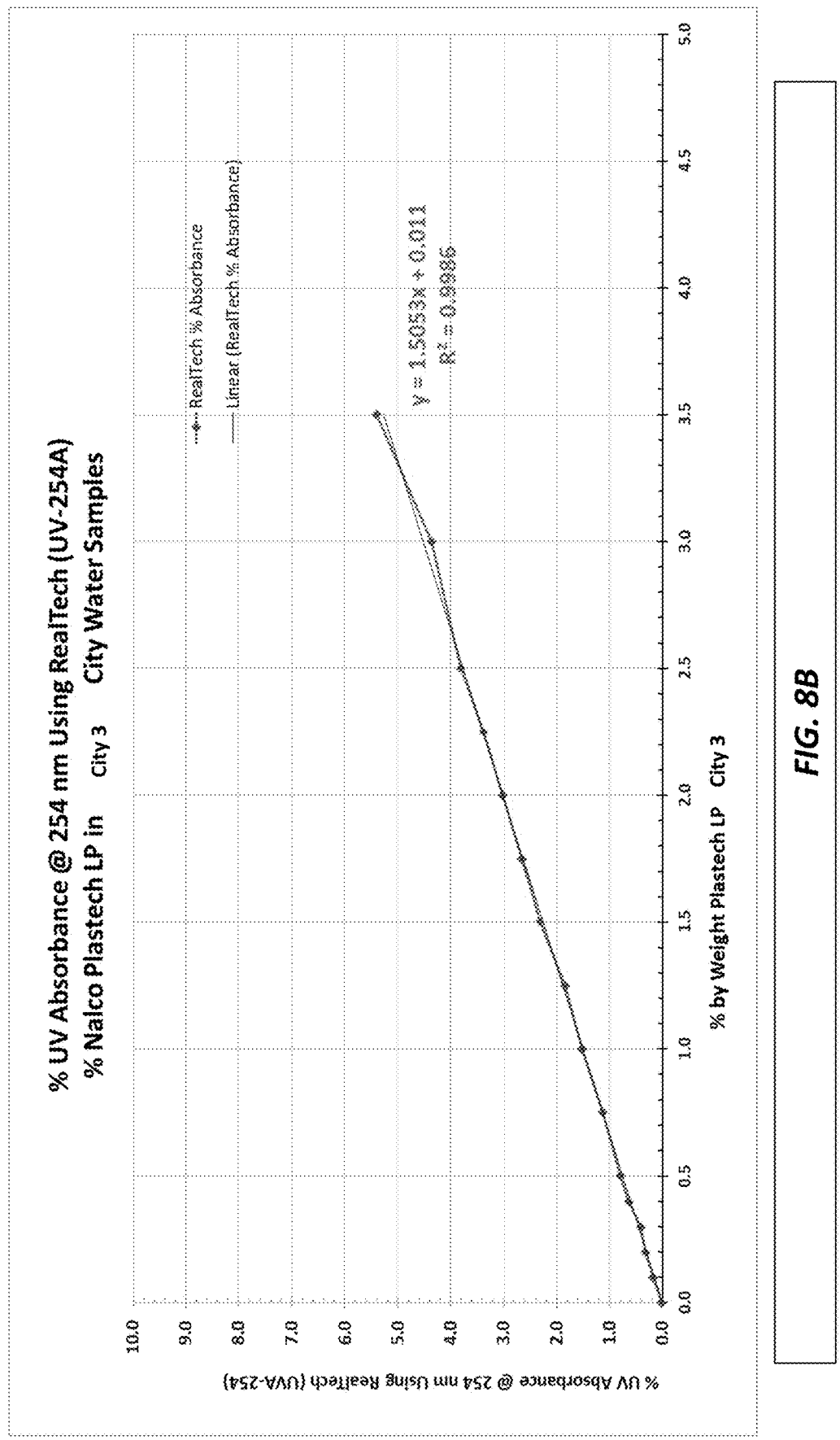
FIG. 8B graphs percent ultraviolet (UV) transmission at 254 nm based on concentration of washing detergent in the city water corresponding to FIG. 8A.

Water samples were obtained from the city water source of Example 1 and subjected to reverse osmosis filtration. The reverse osmosis water was used to prepare a detergent wash water with varying concentrations of detergent. Conductivity measurements were taken with increasing detergent concentrations with a microS instrument. The conductivity measurements were plotted against the concentration of the detergent on a weight percent basis and the results are provided in FIG. 8A. Following that, UV absorbance was measured and plotted against the concentration of the detergent on a weight percent basis; the results are provided in FIG. 8B. Only the RealTech UV 254 UVA was used to collect transmittance data.

Figure 8C:
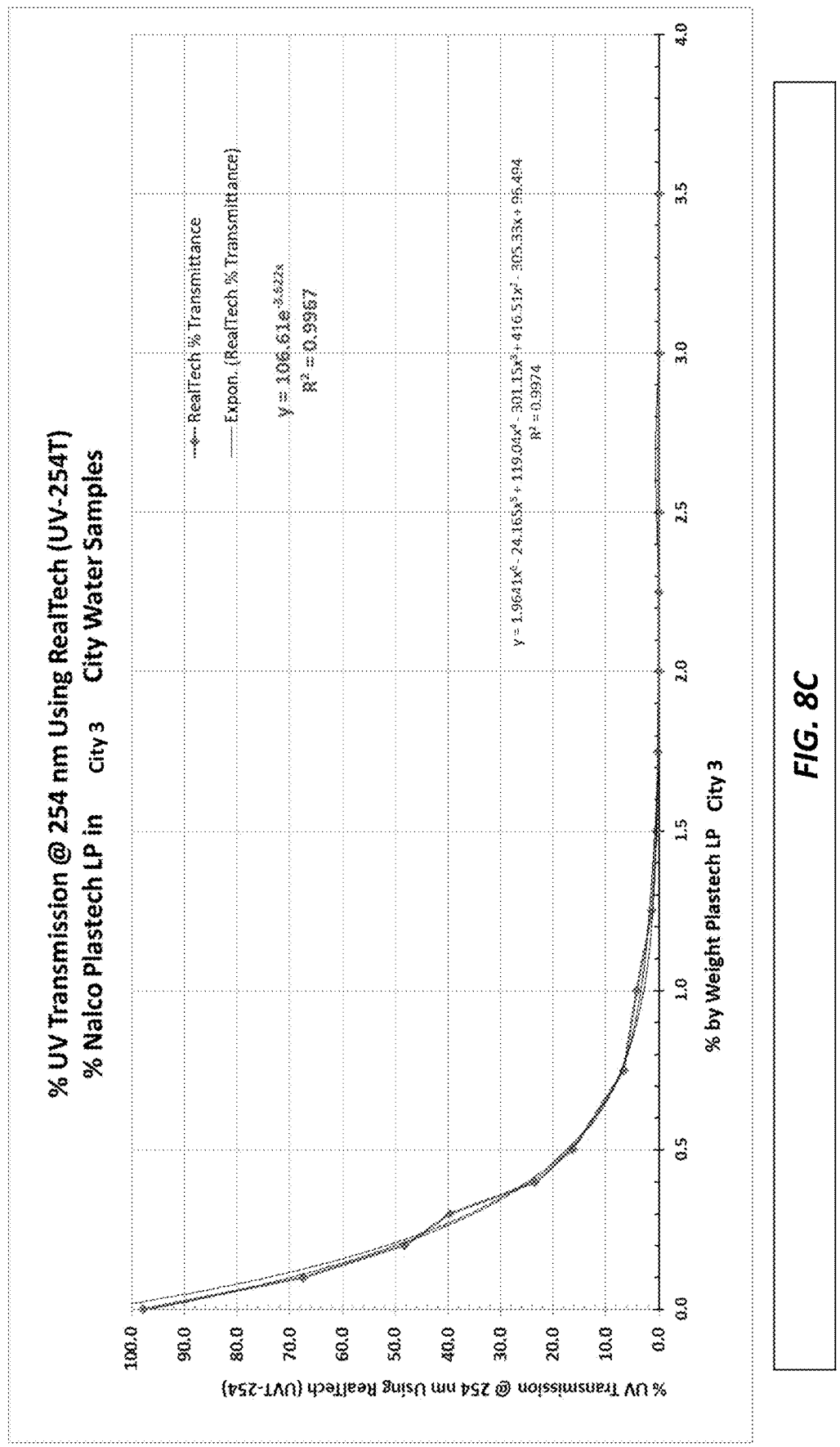
FIG. 8C plots calibration of the percent ultraviolet (UV) transmission at 254 nm based on concentration of washing detergent in the city water corresponding to FIGS. 8A-8B using a RealTech UV 254 UVT.
Figure 8D:
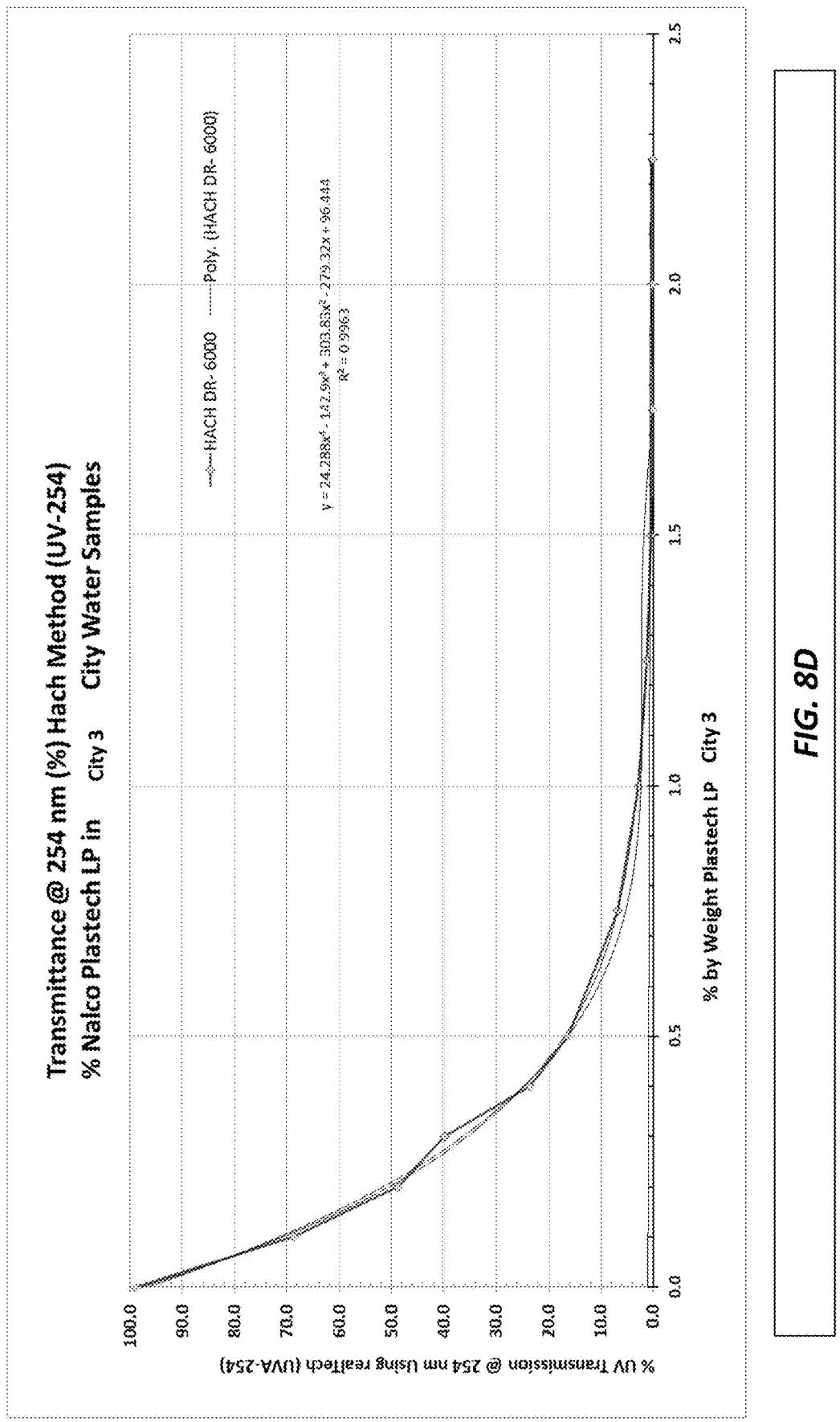
FIG. 8D plots calibration of the percent ultraviolet (UV) transmission at 254 nm based on concentration of washing detergent in the city water corresponding to FIGS. 8A-8B using a Hach DR-6000.

The ability to monitor and adjust concentration of detergent was evaluated along with the ability to monitor those adjust the concentration based on UV transmittance readings. This testing was plotted and is provided in FIGS. 8C and 8D—FIG. 8C using the RealTech UV 254 UVT to measure transmittance and FIG. 8D using the Hach DR-6000 to measure transmittance. As can be seen from FIGS. 8C and 8D, changes to the detergent concentration in a wash water can be monitored via UV transmittance data. This data, based on a different water source demonstrates, that it can be monitored without need for titration and can be subjected to automated monitoring.

Example 5

Figure 9A:
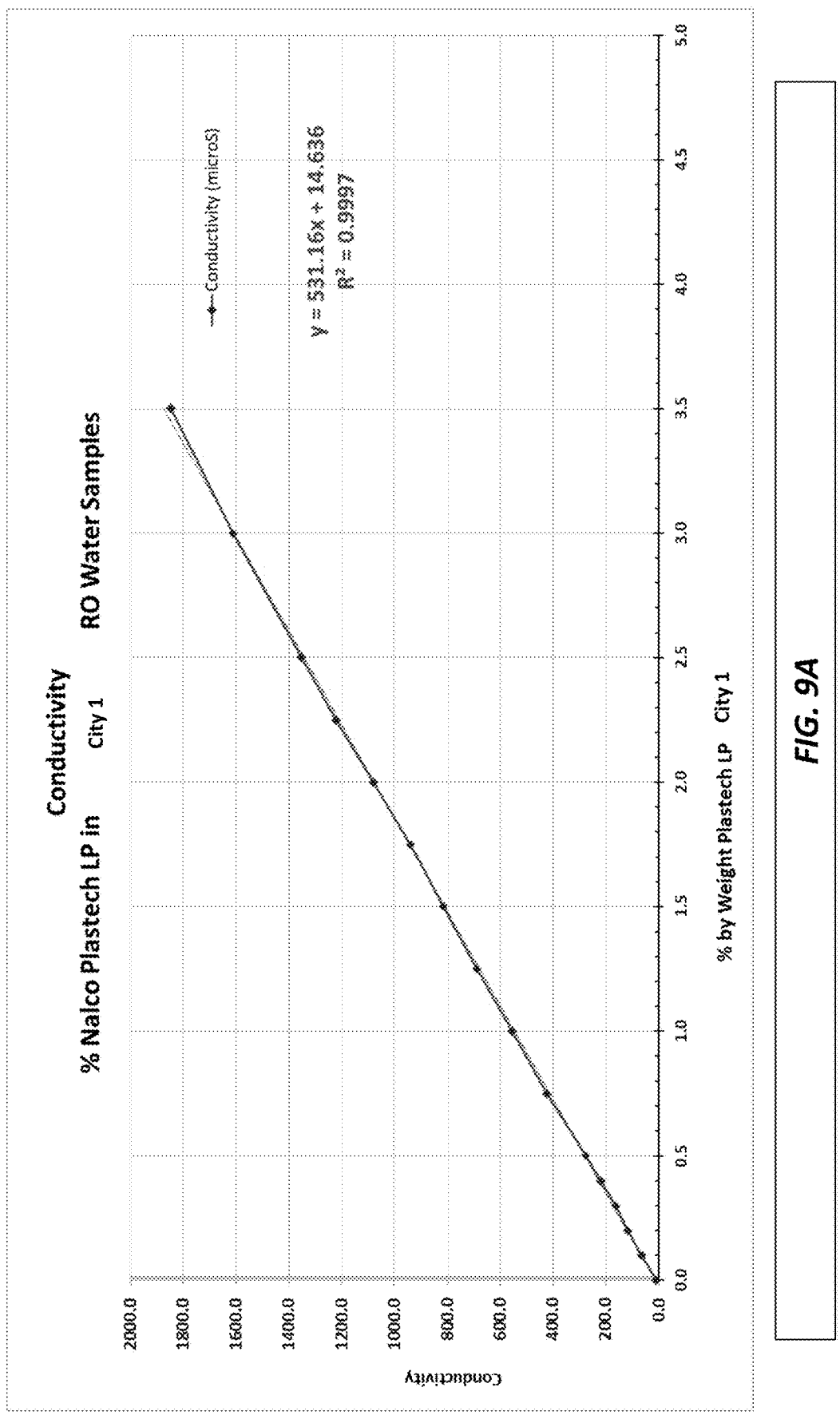
FIG. 9A graphs conductivity based on concentration (by wt. %) of washing detergent in a RO water.
Figure 9B:
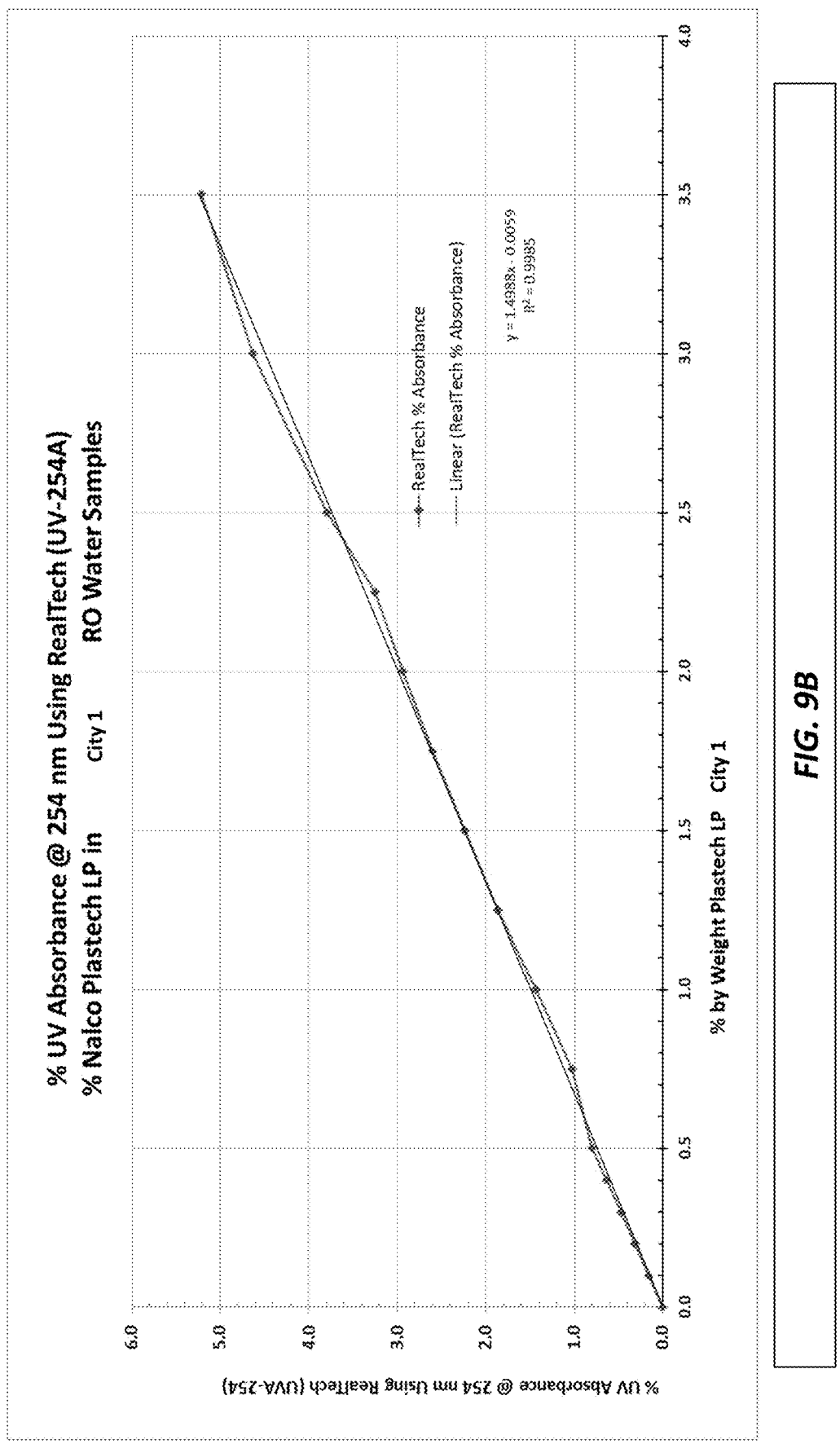
FIG. 9B graphs percent ultraviolet (UV) absorbance at 254 nm based on concentration of washing detergent in the RO water corresponding to FIG. 8A.

Water samples were obtained from a different city water source than that of Examples 1 and 2. Water direct from the city source was used to prepare a detergent wash water with varying concentrations of detergent. Conductivity measurements were taken with increasing detergent concentrations with a microS instrument. The conductivity measurements were plotted against the concentration of the detergent on a weight percent basis and the results are provided in FIG. 9A. Following that, UV absorbance was measured and plotted against the concentration of the detergent on a weight percent basis; the results are provided in FIG. 9B. Only the RealTech UV 254 UVT was used to collect transmittance data.

The ability to monitor and adjust concentration of detergent was evaluated along with the ability to monitor those adjust the concentration based on UV transmittance readings. This testing was plotted and is provided in FIGS. 9C and 9D—FIG. 9C using the RealTech UV 254 UVT to measure transmittance and FIG. 9D using the Hach DR-6000 to measure transmittance. FIG. 10 shows monitoring of the % transmittance and % absorbance at different wash stages. It also includes a comparison of conductivity data. The detergent wash water was introduced in Washer Stage 2 (notably, the conductivity measurement corresponding to that stage was incorrect due to water source).

Figure 9C:
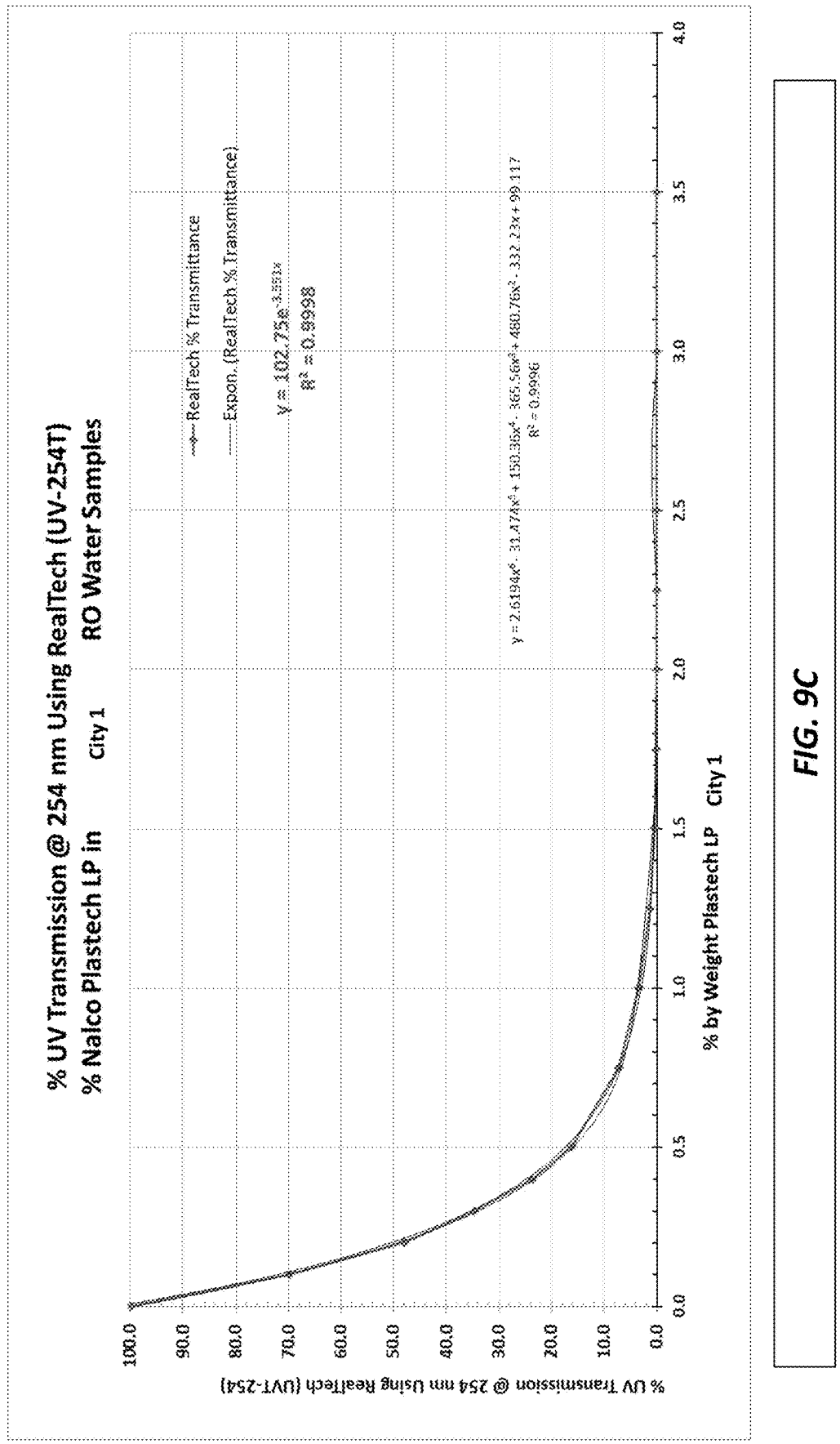
FIG. 9C plots calibration of the percent ultraviolet (UV) transmission at 254 nm based on concentration of washing detergent in the RO water corresponding to FIGS. 9A-9B using a RealTech UV 254 UVT.
Figure 9D:
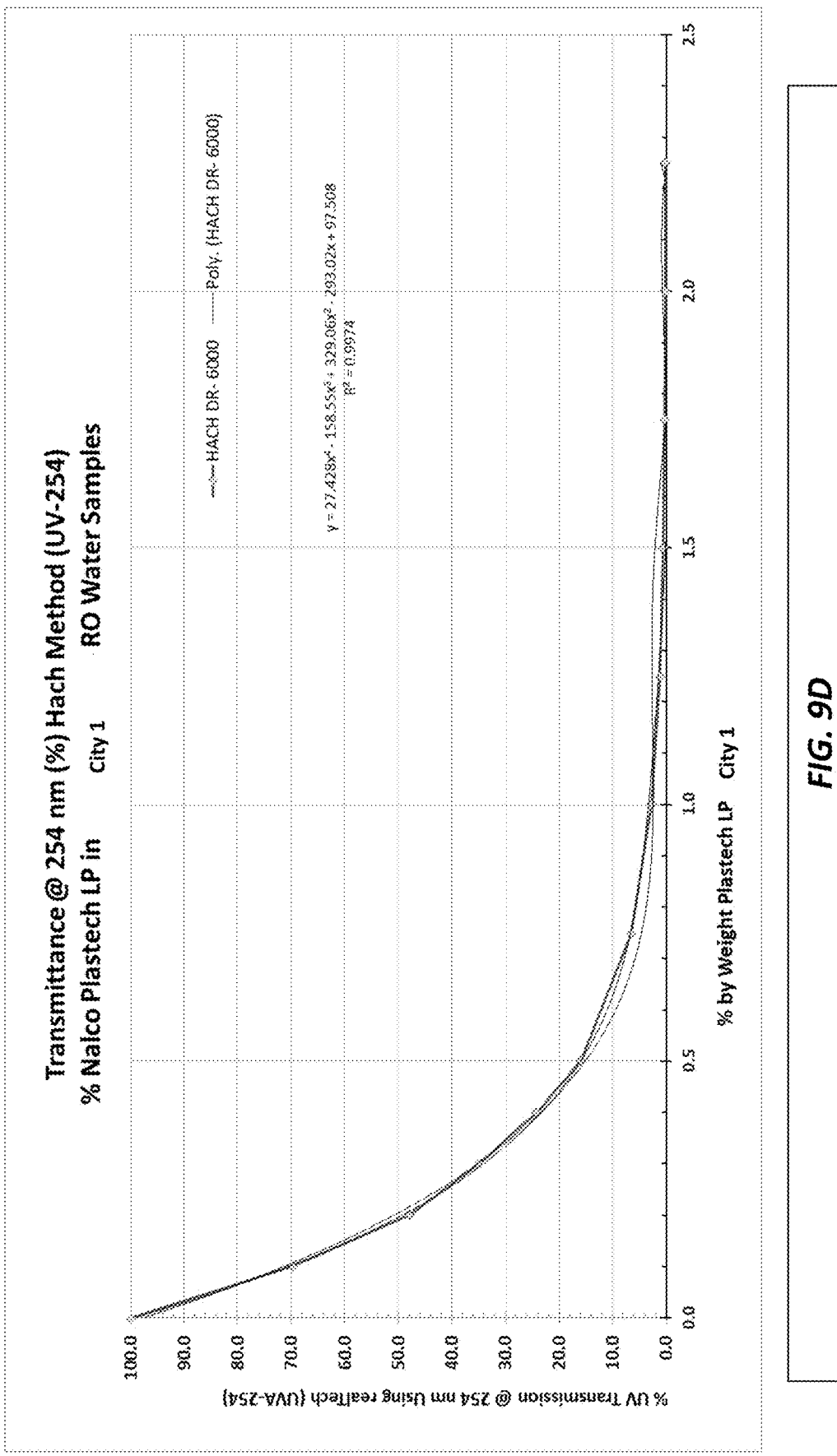
FIG. 9D plots calibration of the percent ultraviolet (UV) transmission at 254 nm based on concentration of washing detergent in the RO water corresponding to FIGS. 9A-9B using a Hach DR-6000.

As can be seen from FIGS. 9C, 9D, and 10, changes to the detergent concentration in a wash water can be monitored via UV transmittance and absorbance data. This data, based on a different water source demonstrates, that it can be monitored without need for titration and can be subjected to automated monitoring. Further, monitoring transmittance and/or absorbance at different washer stages will demonstrate when the detergent is fully rinsed from the parts within the washer; for example, in FIG. 10 it can be seen by washer stage 5 there is no detergent left and at washer stage 4 essentially no detergent remaining.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of cleaning plastic car parts and/or fascia comprising:
    placing plastic car parts and/or fascia on a conveyor;
    activating the conveyor through one or more washing stages of a washing system;
    spraying the plastic car parts and/or fascia with a wash water in one or more washing stages of the washing system; wherein the wash water comprises a detergent; wherein the detergent comprises a surfactant;
    collecting the wash water from the one or more washing stages after spraying;
    sensing the UV transmission or absorbance of the surfactant in the collected wash water via a UV meter;
    comparing, via a controller, the UV transmission or absorbance of the collected wash water and a set point on a calibration plot stored via the controller;
    dosing water or the detergent to the collected wash water based on a difference between the UV transmission or absorbance measured and the set point on the calibration plot;
    recirculating the collected wash water, which has been dosed with water or the detergent, into the washing system.

2. The method of claim 1, wherein there is one washing stage.

3. The method of claim 1, wherein there are at least two washing stages.

4. The method of claim 3, wherein the wash water is collected via a drain in each of the two washing stages and combined in a collected wash water vessel.

5. The method of claim 3, wherein the wash water is collected via a single drain located at a downslope from the at least two washing stages.

6. The method of claim 1, wherein the controller is in communication with the UV meter, and wherein the controller is in communication with a metering pump.

7. The method of claim 6, wherein the controller is in wireless communication with the UV Meter.

8. The method of claim 6, wherein the metering pump doses the detergent into the collected wash water.

9. The method of claim 6, wherein the controller is in communication with a water pump; and wherein the water pump doses water into the collected wash water.

10. The method of claim 1, wherein the UV meter measures transmissions or absorbance at a wavelength of 240 nms to 270 nms.

11. The method of claim 1, further comprising measuring pH of the wash water via a pH meter.

12. The method of claim 1, further comprising measuring conductivity of the wash water via a conductivity meter.

13. The method of claim 1, further comprising rinsing the plastic car parts and/or fascia.

14. The method of claim 4, wherein the collected wash water vessel comprises a drum, a vat, and/or a tube.

15. The method of claim 1, further comprising blowing air on the plastic car parts and/or fascia.

16. The method of claim 15, wherein the blowing is performed by a recirculating air blow-off system.

17. The method of claim 1, further comprising filtering the collected wash water.

18. The method of claim 1, wherein the wash water has aluminum compatibility.

* * * * *